US012726588B2

(12) United States Patent
Zhou et al.

(10) Patent No.: US 12,726,588 B2
(45) Date of Patent: Sep. 1, 2026

(54) SIGNAL TRANSMISSION METHOD AND APPARATUS

(71) Applicant: HUAWEI TECHNOLOGIES CO., LTD., Shenzhen (CN)

(72) Inventors: Weiguang Zhou, Shenzhen (CN); Zhigui Wei, Shenzhen (CN); Jianhong He, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 42 days.

(21) Appl. No.: 19/028,894

(22) Filed: Jan. 17, 2025

(65) Prior Publication Data

US 2025/0168295 A1 May 22, 2025

Related U.S. Application Data

(63) Continuation of application No. PCT/CN2023/107128, filed on Jul. 13, 2023.

(30) Foreign Application Priority Data

Jul. 21, 2022 (CN) ........................ 202210859501.X
Feb. 21, 2023 (CN) ........................ 202310189854.8

(51) Int. Cl.
*H04N 7/083* (2006.01)
*H04N 5/06* (2006.01)

(52) U.S. Cl.
CPC ............... *H04N 7/083* (2013.01); *H04N 5/06* (2013.01)

(58) Field of Classification Search
CPC ............ H04N 7/083; H04N 5/06; H04N 7/16; H04N 21/647; G09G 2370/04;
(Continued)

(56) References Cited

U.S. PATENT DOCUMENTS

2004/0208204 A1* 10/2004 Crinon ................. H04N 21/643 375/E7.017
2008/0130741 A1 6/2008 Chiang et al.
(Continued)

FOREIGN PATENT DOCUMENTS

CN 102118267 B 11/2016
EP 3968318 A1 3/2022
WO 2022155839 A1 7/2022

OTHER PUBLICATIONS

Extended European Search Report in European Appln. No. 23842190.3, mailed on May 8, 2025, 9 pages.
(Continued)

*Primary Examiner* — Michael R Telan
(74) *Attorney, Agent, or Firm* — Fish & Richardson P.C.

(57) ABSTRACT

The present disclosure relates to signal transmission methods and apparatuses. One example method includes obtaining a video signal, where the video signal includes a vertical synchronization signal, a horizontal synchronization signal, a pixel clock signal, a display enable signal, and a video data signal, obtaining active video data in the video data signal based on the pixel clock signal and the display enable signal, encapsulating a vertical blanking packet based on the vertical synchronization signal, encapsulating a horizontal blanking packet based on the horizontal synchronization signal, encapsulating an active video packet based on the active video data, and multiplexing the vertical blanking packet, the horizontal blanking packet, and the active video packet into a video stream for sending.

17 Claims, 33 Drawing Sheets

(58) Field of Classification Search
CPC ................ G09G 2370/10; G09G 5/006; H04L 41/0826; H04L 41/0833; H04L 65/75; H04L 69/16
See application file for complete search history.

(56) References Cited

U.S. PATENT DOCUMENTS

| | | | | |
|---|---|---|---|---|
| 2013/0057763 | A1* | 3/2013 | Cha | G09G 5/006 348/554 |
| 2014/0063033 | A1 | 3/2014 | Bae et al. | |
| 2022/0094994 | A1* | 3/2022 | Lin | G09G 3/3611 |

OTHER PUBLICATIONS

International Standard IEC 60958-1, "Digital audio interface—Part 1: General Edition 3.0," Sep. 2008, 34 pages.
International Standard IEC 61937-1, "Digital audio—Interface for non-linear PCM encoded audio bitstreams applying IEC 60958 Part 1: General, Second edition," Jan. 2007, 24 pages.
International Search Report and Written Opinion in International Appln. No. PCT/CN2023/107128, mailed on Sep. 25, 2023, 13 pages (with English translation).

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RS VD | Shuttle ID | | | | | | | E=1 | S=1 | R=0 | CP=0 | Type=1 | | | | Length=28 | | | | | | | | | T=1 | ECC | | | | | |
| Reserved | | | Component bit width | | | | | Reserved | | | Pixel color gamut | | | | | Reserved | | | | Pixel format | | | | M | C | VFC_VER | | | | | |
| VP | HP | Pixel clock frequency | | | | | | | | | | | | | | | | | | | | | | | | | | | | | |
| Quantity of pixels in a horizontal blanking interval | | | | | | | | | | | | | | | | Quantity of horizontal active pixels | | | | | | | | | | | | | | | |
| Quantity of HSync pixels | | | | | | | | | | | | | | | | Quantity of pixels in a front porch of the horizontal blanking interval | | | | | | | | | | | | | | | |
| Quantity of lines in a vertical blanking interval | | | | | | | | | | | | | | | | Quantity of active lines in a video frame | | | | | | | | | | | | | | | |
| Quantity of VSync lines | | | | | | | | | | | | | | | | Quantity of lines in a front porch of the vertical blanking interval | | | | | | | | | | | | | | | |
| CRC32 | | | | | | | | | | | | | | | | | | | | | | | | | | | | | | | |

FIG. 10

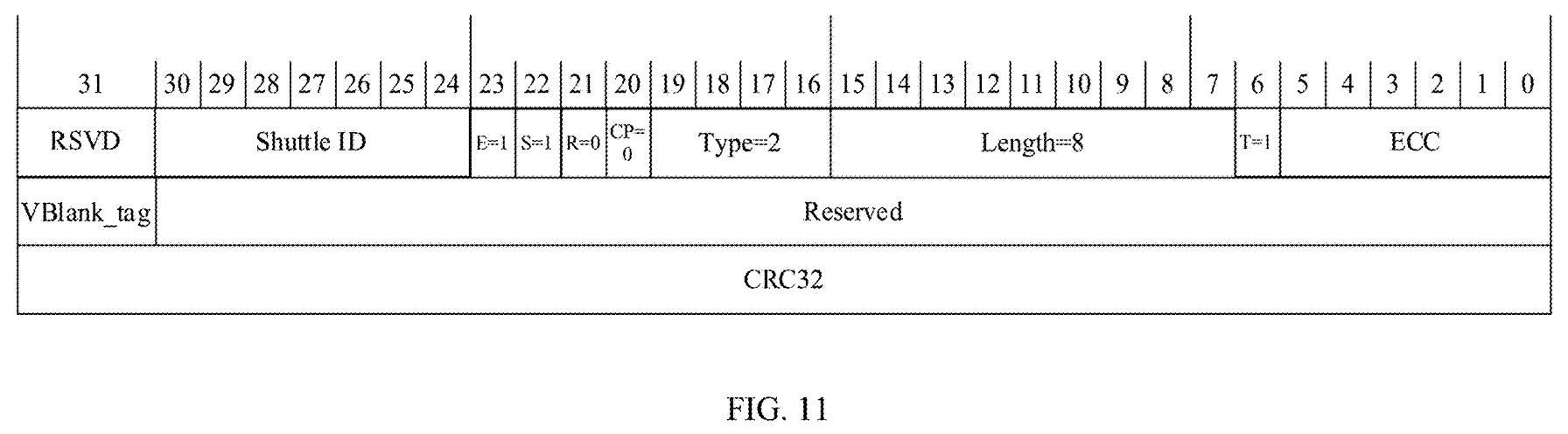

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RSVD | Shuttle ID | | | | | | | E=1 | S=1 | R=0 | CP=0 | Type=2 | | | | Length=8 | | | | | | | | | T=1 | ECC | | | | | |
| VBlank_tag | Reserved | | | | | | | | | | | | | | | | | | | | | | | | | | | | | | |
| CRC32 | | | | | | | | | | | | | | | | | | | | | | | | | | | | | | | |

FIG. 11

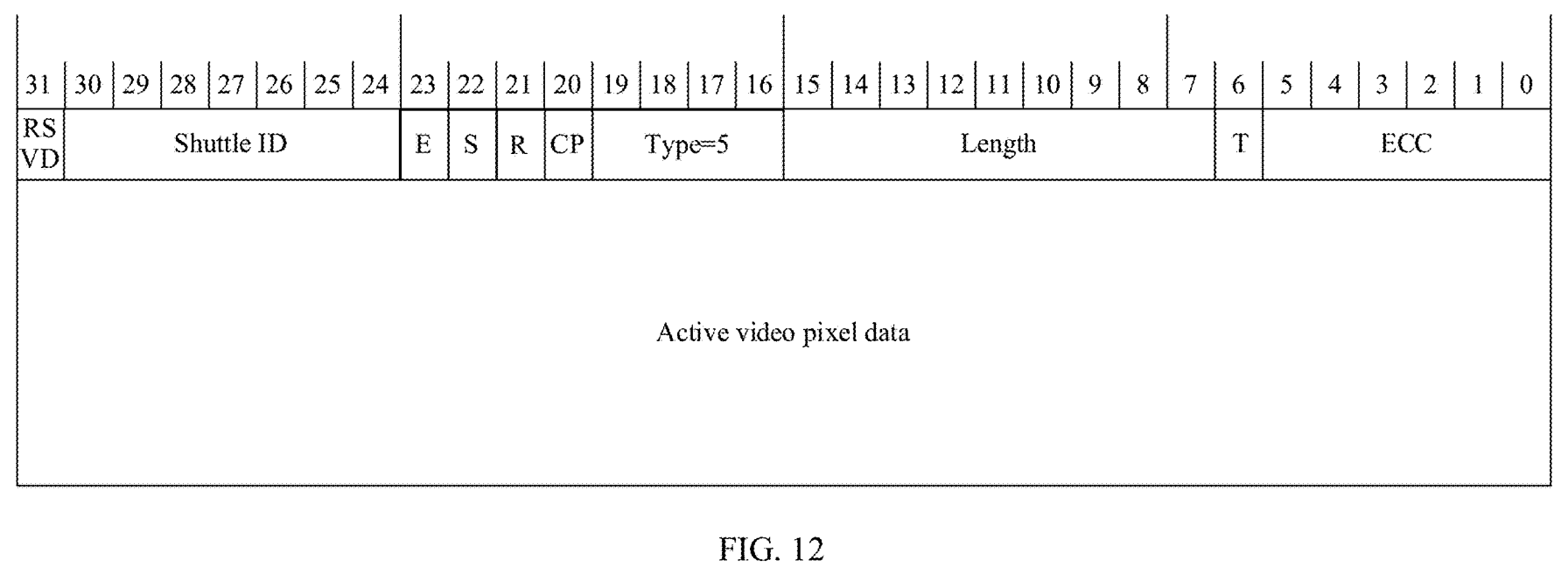

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RSVD | Shuttle ID | | | | | | | E | S | R | CP | Type=5 | | | | Length | | | | | | | | | T | ECC | | | | | |
| Active video pixel data | | | | | | | | | | | | | | | | | | | | | | | | | | | | | | | |

FIG. 12

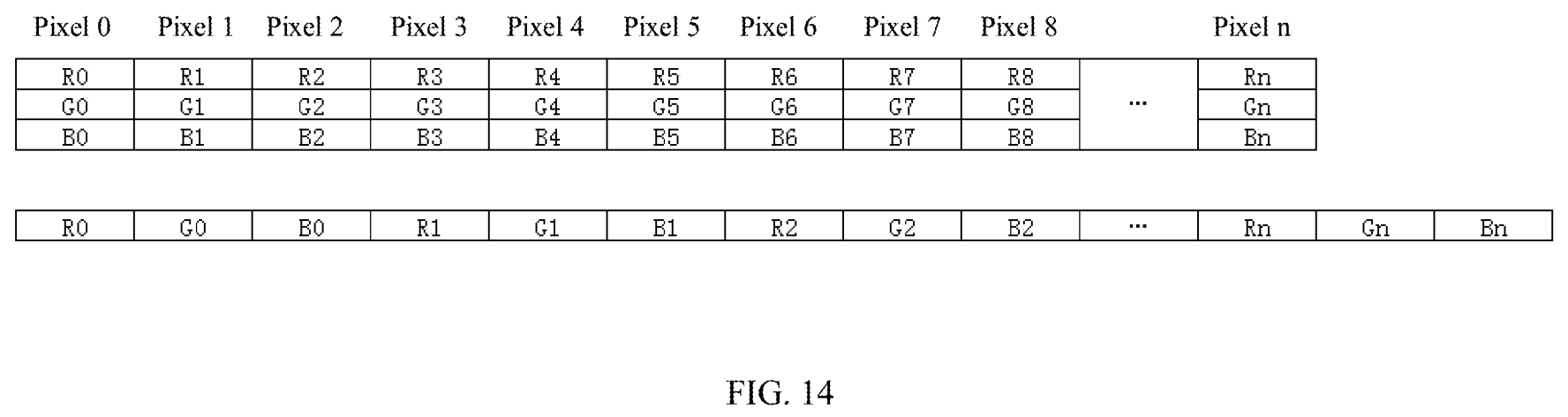

| Pixel 0 | Pixel 1 | Pixel 2 | Pixel 3 | Pixel 4 | Pixel 5 | Pixel 6 | Pixel 7 | Pixel 8 | | Pixel n |
|---|---|---|---|---|---|---|---|---|---|---|
| R0 | R1 | R2 | R3 | R4 | R5 | R6 | R7 | R8 | ... | Rn |
| G0 | G1 | G2 | G3 | G4 | G5 | G6 | G7 | G8 | | Gn |
| B0 | B1 | B2 | B3 | B4 | B5 | B6 | B7 | B8 | | Bn |

| R0 | G0 | B0 | R1 | G1 | B1 | R2 | G2 | B2 | ... | Rn | Gn | Bn |
|---|---|---|---|---|---|---|---|---|---|---|---|---|

FIG. 14

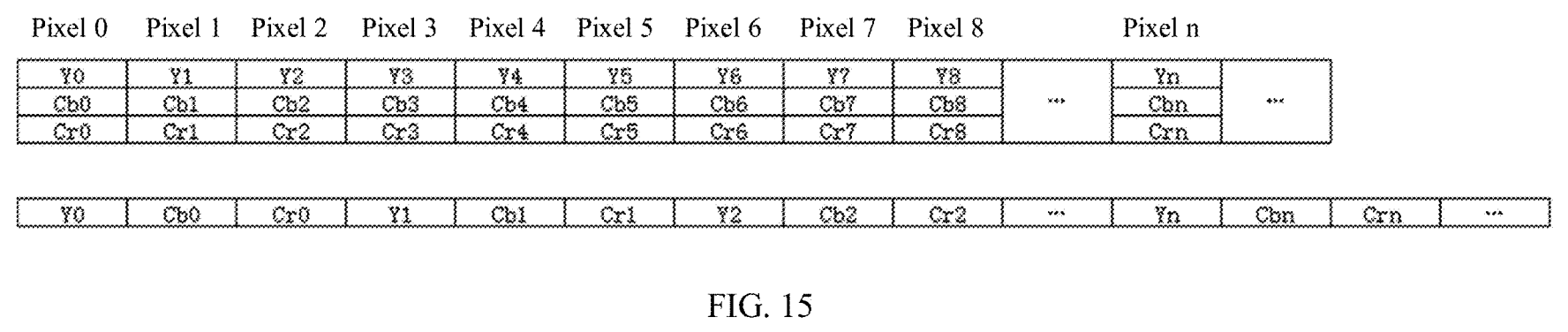

| Pixel 0 | Pixel 1 | Pixel 2 | Pixel 3 | Pixel 4 | Pixel 5 | Pixel 6 | Pixel 7 | Pixel 8 | | Pixel n | |
|---|---|---|---|---|---|---|---|---|---|---|---|
| Y0 | Y1 | Y2 | Y3 | Y4 | Y5 | Y6 | Y7 | Y8 | ... | Yn | ... |
| Cb0 | Cb1 | Cb2 | Cb3 | Cb4 | Cb5 | Cb6 | Cb7 | Cb8 | | Cbn | |
| Cr0 | Cr1 | Cr2 | Cr3 | Cr4 | Cr5 | Cr6 | Cr7 | Cr8 | | Crn | |

| Y0 | Cb0 | Cr0 | Y1 | Cb1 | Cr1 | Y2 | Cb2 | Cr2 | ... | Yn | Cbn | Crn | ... |
|---|---|---|---|---|---|---|---|---|---|---|---|---|---|

FIG. 15

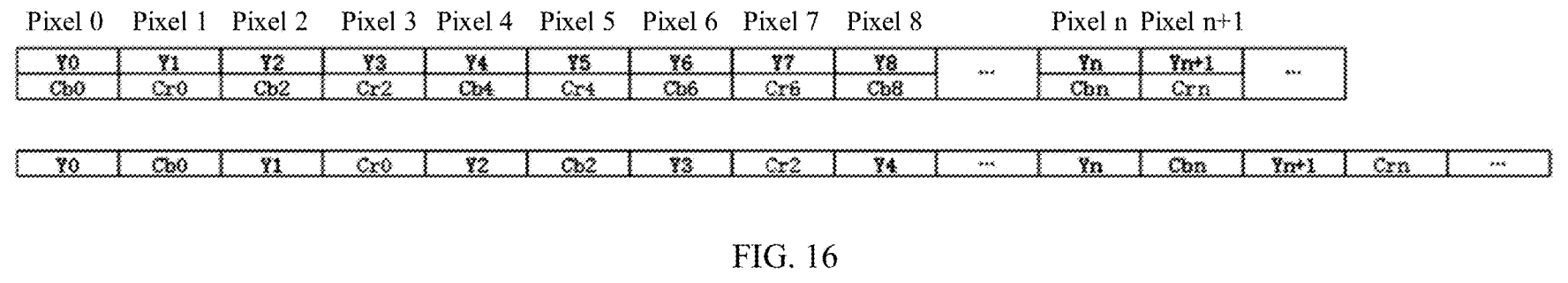

| Pixel 0 | Pixel 1 | Pixel 2 | Pixel 3 | Pixel 4 | Pixel 5 | Pixel 6 | Pixel 7 | Pixel 8 | | Pixel n | Pixel n+1 | |
|---|---|---|---|---|---|---|---|---|---|---|---|---|
| Y0 | Y1 | Y2 | Y3 | Y4 | Y5 | Y6 | Y7 | Y8 | ... | Yn | Yn+1 | ... |
| Cb0 | Cr0 | Cb2 | Cr2 | Cb4 | Cr4 | Cb6 | Cr6 | Cb8 | | Cbn | Crn | |

| Y0 | Cb0 | Y1 | Cr0 | Y2 | Cb2 | Y3 | Cr2 | Y4 | ... | Yn | Cbn | Yn+1 | Crn | ... |
|---|---|---|---|---|---|---|---|---|---|---|---|---|---|---|

FIG. 16

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>RSVD</td><td colspan="7">Shuttle ID</td><td>B=0</td><td>S=1</td><td>E=0</td><td>CP=1</td><td colspan="4">Type=5</td><td colspan="9">Length=508</td><td>T=1</td><td colspan="6">ECC</td></tr>
<tr><td colspan="8">R0[7:0]</td><td colspan="8">G0[7:0]</td><td colspan="8">B0[7:0]</td><td colspan="8">R1[7:0]</td></tr>
<tr><td colspan="8">G1[7:0]</td><td colspan="8">B1[7:0]</td><td colspan="8">R2[7:0]</td><td colspan="8">G2[7:0]</td></tr>
<tr><td colspan="8">G2[7:0]</td><td colspan="8">R3[7:0]</td><td colspan="8">G3[7:0]</td><td colspan="8">B3[7:0]</td></tr>
<tr><td colspan="8">R4[7:0]</td><td colspan="8">G4[7:0]</td><td colspan="8">B4[7:0]</td><td colspan="8">R5[7:0]</td></tr>
<tr><td colspan="32">...</td></tr>
<tr><td colspan="8">R166[7:0]</td><td colspan="8">R167[7:0]</td><td colspan="8">G167[7:0]</td><td colspan="8">B167[7:0]</td></tr>
<tr><td colspan="8">R168[7:0]</td><td colspan="8">G168[7:0]</td><td colspan="8">B168[7:0]</td><td colspan="8">R169[7:0]</td></tr>
</table>

AVP 0 (S=1, E=0)

FIG. 18A

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RSVD | Shuttle ID | | | | | | | E=0 | S=0 | R=0 | CP=1 | Type=5 | | | | Length=508 | | | | | | | | | T=1 | ECC | | | | | |
| G169[7:0] | | | | | | | | B169[7:0] | | | | | | | | R170[7:0] | | | | | | | | G170[7:0] | | | | | | | |
| B170[7:0] | | | | | | | | R171[7:0] | | | | | | | | G171[7:0] | | | | | | | | B171[7:0] | | | | | | | |
| R172[7:0] | | | | | | | | G172[7:0] | | | | | | | | B172[7:0] | | | | | | | | R173[7:0] | | | | | | | |
| G173[7:0] | | | | | | | | B173[7:0] | | | | | | | | R174[7:0] | | | | | | | | G174[7:0] | | | | | | | |
| ... | | | | | | | | | | | | | | | | | | | | | | | | | | | | | | | |
| R336[7:0] | | | | | | | | G336[7:0] | | | | | | | | B336[7:0] | | | | | | | | R337[7:0] | | | | | | | |
| G337[7:0] | | | | | | | | B337[7:0] | | | | | | | | R338[7:0] | | | | | | | | G338[7:0] | | | | | | | |

AVP 1 (S=0, E=0)

FIG. 18B

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>RSVD</td><td colspan="7">Shuttle ID</td><td>E=1</td><td>S=0</td><td>R=0</td><td>CP=1</td><td colspan="4">Type=5</td><td colspan="9">Length=508</td><td>T=1</td><td colspan="6">ECC</td></tr>
<tr><td colspan="8">G1185[7:0]</td><td colspan="8">B1185[7:0]</td><td colspan="8">R1186[7:0]</td><td colspan="8">G1186[7:0]</td></tr>
<tr><td colspan="8">B1186[7:0]</td><td colspan="8">R1187[7:0]</td><td colspan="8">G1187[7:0]</td><td colspan="8">B1187[7:0]</td></tr>
<tr><td colspan="8">R1188[7:0]</td><td colspan="8">G1188[7:0]</td><td colspan="8">B1188[7:0]</td><td colspan="8">R1189[7:0]</td></tr>
<tr><td colspan="8">G1189[7:0]</td><td colspan="8">B1189[7:0]</td><td colspan="8">R1190[7:0]</td><td colspan="8">G1190[7:0]</td></tr>
<tr><td colspan="32">...</td></tr>
<tr><td colspan="8">G1277[7:0]</td><td colspan="8">B1277[7:0]</td><td colspan="8">R1278[7:0]</td><td colspan="8">G1278[7:0]</td></tr>
<tr><td colspan="8">B1278[7:0]</td><td colspan="8">R1279[7:0]</td><td colspan="8">G1279[7:0]</td><td colspan="8">B1279[7:0]</td></tr>
</table>

AVP 7 (S=0, E=1)

FIG. 18C

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>RSVD</td><td colspan="7">Shuttle ID</td><td>E</td><td>S</td><td>R</td><td>CP</td><td colspan="4">Type=5</td><td colspan="9">Length</td><td>T=1</td><td colspan="6">ECC</td></tr>
<tr><td colspan="10">R0[9:0]</td><td colspan="10">G0[9:0]</td><td colspan="10">B0[9:0]</td><td colspan="2">R1[9:8]</td></tr>
<tr><td colspan="8">R1[7:0]</td><td colspan="10">G1[9:0]</td><td colspan="10">B1[9:0]</td><td colspan="4">R2[9:6]</td></tr>
<tr><td colspan="6">R2[5:0]</td><td colspan="10">G2[9:0]</td><td colspan="10">B2[9:0]</td><td colspan="6">R3[9:4]</td></tr>
<tr><td colspan="4">R3[3:0]</td><td colspan="10">G3[9:0]</td><td colspan="10">B3[9:0]</td><td colspan="8">R4[9:2]</td></tr>
<tr><td colspan="2">R4[1:0]</td><td colspan="10">G4[9:0]</td><td colspan="10">B4[9:0]</td><td colspan="10">R5[9:0]</td></tr>
<tr><td colspan="10">G5[9:0]</td><td colspan="10">B5[9:0]</td><td colspan="10">R6[9:0]</td><td colspan="2">G6[9:8]</td></tr>
<tr><td colspan="8">G6[7:0]</td><td colspan="10">B6[9:0]</td><td colspan="10">R7[9:0]</td><td colspan="4">G7[9:6]</td></tr>
<tr><td colspan="6">G7[5:0]</td><td colspan="10">B7[9:0]</td><td colspan="10">R8[9:0]</td><td colspan="6">G8[9:4]</td></tr>
<tr><td colspan="32">...</td></tr>
<tr><td colspan="10">G133[9:0]</td><td colspan="10">B133[9:0]</td><td colspan="10">R134[9:0]</td><td colspan="2">G134[9:8]</td></tr>
<tr><td colspan="8">G134[7:0]</td><td colspan="10">B134[9:0]</td><td colspan="10">R135[9:0]</td><td colspan="4">G135[9:6]</td></tr>
</table>

AVP (S=1, E=0)

FIG. 20A

AVP (S=0, E=0)

AVP (S=0, E=1)

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>RSVD</td><td colspan="7">Shuttle ID</td><td>E=1</td><td>S=1</td><td>R=0</td><td>CP=0</td><td colspan="4">Type=3</td><td colspan="9">Length=40</td><td>T=1</td><td colspan="6">HEC</td></tr>
<tr><td colspan="8">HB 0</td><td colspan="8">HB 1</td><td colspan="8">HB 2</td><td colspan="8">HB 3</td></tr>
<tr><td colspan="8">DB 0</td><td colspan="8">DB 1</td><td colspan="8">DB 2</td><td colspan="8">DB 3</td></tr>
<tr><td colspan="8">DB 4</td><td colspan="8">DB 5</td><td colspan="8">DB 6</td><td colspan="8">DB 7</td></tr>
<tr><td colspan="8">DB 8</td><td colspan="8">DB 9</td><td colspan="8">DB 10</td><td colspan="8">DB 11</td></tr>
<tr><td colspan="8">DB 12</td><td colspan="8">DB 13</td><td colspan="8">DB 14</td><td colspan="8">DB 15</td></tr>
<tr><td colspan="8">DB 16</td><td colspan="8">DB 17</td><td colspan="8">DB 18</td><td colspan="8">DB 19</td></tr>
<tr><td colspan="8">DB 20</td><td colspan="8">DB 21</td><td colspan="8">DB 22</td><td colspan="8">DB 23</td></tr>
<tr><td colspan="8">DB 24</td><td colspan="8">DB 25</td><td colspan="8">DB 26</td><td colspan="8">DB 27</td></tr>
<tr><td colspan="8">DB 28</td><td colspan="8">DB 29</td><td colspan="8">DB 30</td><td colspan="8">DB 31</td></tr>
<tr><td colspan="32">CRC32</td></tr>
</table>

FIG. 21

<table>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>RS VD</td><td colspan="7">Shuttle ID</td><td>E=1</td><td>S=1</td><td>R=0</td><td>CP =0</td><td colspan="4">Type</td><td colspan="9">Length</td><td>T</td><td colspan="6">ECC</td></tr>
<tr><td colspan="8">HB 0</td><td colspan="8">HB 1</td><td colspan="8">HB 2</td><td colspan="8">HB 3</td></tr>
<tr><td colspan="32">Audio slot 0</td></tr>
<tr><td colspan="32">Audio slot 1</td></tr>
<tr><td colspan="32">Audio slot 2</td></tr>
<tr><td colspan="32">Audio slot 3</td></tr>
<tr><td colspan="32">Audio slot 4</td></tr>
<tr><td colspan="32">Audio slot 5</td></tr>
<tr><td colspan="32">Audio slot 6</td></tr>
<tr><td colspan="32">Audio slot 7</td></tr>
<tr><td colspan="32">Audio slot 8</td></tr>
<tr><td colspan="32">...</td></tr>
</table>

FIG. 24

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| RSVD | Shuttle ID | | | | | | | E | S | R | CP | Type | | | | Length | | | | | | | | | T | ECC | | | | | |
| Valid payload | | | | | | | | | | | | | | | | | | | | | | | | | | | | | | | |

FIG. 25

SIGNAL TRANSMISSION METHOD AND APPARATUS

CROSS-REFERENCE TO RELATED APPLICATIONS

This application is a continuation of International Application No. PCT/CN2023/107128, filed on Jul. 13, 2023, which claims priority to Chinese Patent Application No. 202210859501.X, filed on Jul. 21, 2022 and Chinese Patent Application No. 202310189854.8, filed on Feb. 21, 2023. All of the aforementioned patent applications are hereby incorporated by reference in their entireties.

TECHNICAL FIELD

Embodiments of this application relate to the field of audio/video processing technologies, and in particular, to a signal transmission method and apparatus.

BACKGROUND

Currently, when a video signal is transmitted between a video source device like a computer, a portable computer, a mobile phone, or a tablet computer and a video sink device like a display, the video signal needs to be first converted into a DP stream using a display port (display port, DP) controller in the video source device, then the DP stream is converted into a USB 4/TBT packet using a DP input (IN) adapter in a universal serial bus (universal serial bus, USB) 4/thunderbolt (thunderbolt, TBT) router (router), and then the USB 4/TBT packet is transmitted to the video sink device over a USB 4/TBT network, restored into the DP stream based on the packet using a DP output (OUT) adapter in the USB 4/TBT router of the video sink device, and then restored into the video signal using a DP controller.

However, during the foregoing signal transmission, the video signal needs to be processed by the DP controller and then sent to the USB/TBT adapter for processing. This increases a transmission delay of the video signal. In addition, hardware devices such as the DP controller need to be integrated into both the video source device and the video sink device, resulting in additional costs and power consumption.

SUMMARY

Embodiments of this application provide a signal transmission method and apparatus, to reduce a transmission delay of a video signal, and reduce costs and power consumption of a video signal sending device (for example, a video source device) and a video signal receiving device (a video sink device).

According to a first aspect, an embodiment of this application provides a signal transmission method. The method may be applied to a first device, a component (for example, a processor, a chip, or a chip system) of the first device, an apparatus used together with the first device, or the like. The first device may be a video source device like a set-top box or a game console, or may be a device like a terminal device, a computer, or a portable computer that sends a video signal. An example in which the method is applied to the first device is used below. The method includes: obtaining a video signal, where the video signal includes a vertical synchronization signal, a horizontal synchronization signal, a pixel clock signal, a display enable signal, and a video data signal; obtaining active video data in the video data signal based on the pixel clock signal and the display enable signal; encapsulating a vertical blanking packet based on the vertical synchronization signal, encapsulating a horizontal blanking packet based on the horizontal synchronization signal, and encapsulating an active video packet based on the active video data; and multiplexing the vertical blanking packet, the horizontal blanking packet, and the active video packet into a video stream for sending. Optionally, in this embodiment of this application, the vertical blanking packet, the horizontal blanking packet, and the active video packet may be multiplexed into the video stream using a stream multiplexer (for example, a video stream multiplexer or an audio/video stream multiplexer).

It should be understood that, in this embodiment of this application, that a plurality of types of packets are multiplexed into the video stream may mean that the plurality of types of packets are transmitted via one video stream, and an identifier of the video stream may be carried in each of the plurality of types of packets. For example, the multiplexing the vertical blanking packet, the horizontal blanking packet, and the active video packet into a video stream may mean that the vertical blanking packet, the horizontal blanking packet, and the active video packet are transmitted via one video stream, where the video stream includes the vertical blanking packet, the horizontal blanking packet, and the active video packet, and an identifier of the video stream may be carried in each of the vertical blanking packet, the horizontal blanking packet, and the active video packet.

According to the foregoing method, the video signal may be directly encapsulated into a packet for transmission, and the video signal does not need to be processed by a DP controller and then sent to a USB/TBT adapter for encapsulation. This can reduce a transmission delay of the video signal. In addition, an additional DP controller does not need to be integrated into a video signal sending device (for example, the first device) and a video signal receiving device, and a DP electrical layer and a DP logical layer do not need to be integrated into the USB/TBT adapter or the like. This can reduce costs and power consumption of the video signal sending device and the video signal receiving device.

In a possible design, the sending the video stream includes: sending the video stream via a transport layer and a physical layer of a unified multimedia interconnection interface (unified multimedia interconnection, UMI).

In this embodiment of this application, an audio/video sending adapter (or a video sending adapter) in a sending device may encapsulate the video signal into a UMI packet, and send the video stream obtained by multiplexing the UMI packet to an audio/video receiving adapter (or a video receiving adapter) in a corresponding receiving device via a transport layer and a physical layer of a UMI network (including an electrical layer and a logical layer). The audio/video receiving adapter converts the UMI packet into the video signal. This reduces costs and power consumption of the video signal sending device and the video signal receiving device.

In a possible design, the method further includes: obtaining, based on the pixel clock signal and the display enable signal, descriptive information in a blanking interval in the video data signal; and encapsulating a descriptive information packet based on the descriptive information. The multiplexing the vertical blanking packet, the horizontal blanking packet, and the active video packet into a video stream for sending includes: multiplexing the vertical blanking packet, the horizontal blanking packet, the active video packet, and the descriptive information packet into the video stream for sending.

Optionally, the encapsulating a descriptive information packet based on the descriptive information includes: when the video signal further includes a channel-associated audio signal, encapsulating the descriptive information packet based on the descriptive information and the audio signal.

In the foregoing design, channel-associated data such as audio and video configuration information and control information may be transmitted via the descriptive information packet. This helps ensure integrity and reliability of video signal transmission.

In a possible design, the method further includes: when the video signal further includes a channel-associated audio signal, encapsulating an audio sampling packet based on the audio signal. The multiplexing the vertical blanking packet, the horizontal blanking packet, the active video packet, and the descriptive information packet into the video stream for sending includes: multiplexing the vertical blanking packet, the horizontal blanking packet, the active video packet, the descriptive information packet, and the audio sampling packet into the video stream for sending.

In the foregoing design, the audio signal and the descriptive information are separately transmitted. This helps a receive end quickly process the audio signal when an audio-only processing device like a power amplifier (speaker) exists at the receive end.

In a possible design, the method further includes: encrypting the active video packet and the audio sampling packet based on an encryption parameter and an encryption key, to obtain an encrypted active video packet and an encrypted audio sampling packet; and encapsulating an encryption description packet based on the encryption parameter, and encapsulating a key distribution packet based on the encryption key. The multiplexing the vertical blanking packet, the horizontal blanking packet, the active video packet, the descriptive information packet, and the audio sampling packet into the video stream for sending includes: multiplexing the vertical blanking packet, the horizontal blanking packet, the encrypted active video packet, the descriptive information packet, the encrypted audio sampling packet, the encryption description packet, and the key distribution packet into the video stream for sending.

In the foregoing design, confidential transmission of audio/video data can be implemented, to meet transmission requirements of a user in different scenarios.

In a possible design, a plurality of vertical blanking packets, encryption description packets, and key distribution packets are consecutively and repeatedly sent in the video stream.

The vertical blanking packet in the video packet is used to transmit the vertical synchronization signal, to indicate the start of one frame of video image, and the encryption description packet and the key distribution packet are used to decrypt the active video data, if these packets are transmitted incorrectly, the video signal may not be correctly output. In the foregoing design, the plurality of packets are consecutively and repeatedly sent. This can improve reliability of video signal transmission.

In a possible design, packet headers of the vertical blanking packet, the encryption description packet, and the key distribution packet each include a retry (Retry) flag, and when the retry flag is 1, it indicates a receive end to check whether the packet is correct and initiate a retransmission request when the packet is incorrect.

In the foregoing design, the receive end may be indicated to check whether the vertical blanking packet, the encryption description packet, and the key distribution packet are correct. This improves reliability of signal transmission.

In a possible design, the encapsulating a vertical blanking packet based on the vertical synchronization signal includes: encapsulating the vertical blanking packet based on the vertical synchronization signal and video frame control information, where the video frame control information includes a pixel clock parameter of the pixel clock signal.

In the foregoing design, the video frame control information is carried in the vertical blanking packet. This facilitates recovery of the video signal by the receive end.

In a possible design, the encapsulating a vertical blanking packet based on the vertical synchronization signal includes: encapsulating the vertical blanking packet based on the vertical synchronization signal and the display enable (DE) signal.

In a possible design, the horizontal blanking packet may be further encapsulated based on a horizontal blanking interval (HBlank) end signal. Optionally, the horizontal blanking packet may further include a vertical blanking interval flag (VBlank_tag).

According to a second aspect, an embodiment of this application provides a signal transmission method. The method may be applied to a second device, a component (for example, a processor, a chip, or a chip system) of the second device, an apparatus used together with the second device, or the like. The second device may be a video sink device like a display or a television, or may be a device like a terminal device, a computer, or a portable computer that receives a video signal. An example in which the method is applied to the second device is used below. The method includes: receiving a video stream, where the video stream includes a vertical blanking packet, a horizontal blanking packet, and an active video packet; generating a vertical synchronization signal based on the vertical blanking packet, and generating a horizontal synchronization signal based on the horizontal blanking packet; generating a video data signal and a display enable signal based on the vertical synchronization signal, the horizontal synchronization signal, a pixel clock signal, and active video data carried in the active video packet; and outputting a video signal, where the video signal includes the vertical synchronization signal, the horizontal synchronization signal, the pixel clock signal, the display enable signal, and the video data signal. Optionally, in this embodiment of this application, the video stream may be demultiplexed using a stream demultiplexer (for example, a video stream demultiplexer or an audio/video stream demultiplexer) and the like, to obtain the vertical blanking packet, the horizontal blanking packet, and the active video packet.

It should be understood that, in this embodiment of this application, that the video stream is demultiplexed, to obtain a plurality of types of packets may mean that the plurality of types of packets in the video stream are identified (or classified) based on identifiers of the packets. For example, the video stream includes the vertical blanking packet, the horizontal blanking packet, and the active video packet. That the video stream is demultiplexed, to obtain the vertical blanking packet, the horizontal blanking packet, and the active video packet may mean that the vertical blanking packet, the horizontal blanking packet, and the active video packet in the video stream are identified (or classified) based on an identifier of the vertical blanking packet (for example, 4b'0001), an identifier of the horizontal blanking packet (for example, 4b'0010), and an identifier of the active video packet (for example, 4b'0101).

In a possible design, the receiving a video stream includes: receiving the video stream via a transport layer and a physical layer of a UMI.

In a possible design, the video stream further includes a descriptive information packet. The generating a video data signal and a display enable signal based on the vertical synchronization signal, the horizontal synchronization signal, a pixel clock signal, and active video data carried in the active video packet includes: generating the video data signal and the display enable signal based on the vertical synchronization signal, the horizontal synchronization signal, the pixel clock signal, the active video data carried in the active video packet, and descriptive information carried in the descriptive information packet.

In a possible design, the method further includes: generating an audio signal based on the descriptive information packet, where the output video signal further includes the audio signal.

In a possible design, the video stream further includes an audio sampling packet. The method further includes: generating an audio signal based on the audio sampling packet, where the output video signal further includes the audio signal.

In a possible design, the video stream further includes an encryption description packet and a key distribution packet, and the active video packet is an encrypted active video packet. The method further includes: obtaining an encryption parameter carried in the encryption description packet, and obtaining an encryption key carried in the key distribution packet; and decrypting the encrypted active video packet based on the encryption parameter and the encryption key, to obtain a decrypted active video packet.

In a possible design, the video stream further includes an encryption description packet and a key distribution packet, and the active video packet and the audio sampling packet are an encrypted active video packet and an encrypted audio sampling packet. The method further includes: obtaining an encryption parameter carried in the encryption description packet, and obtaining an encryption key carried in the key distribution packet; and decrypting the encrypted active video packet and the encrypted audio sampling packet based on the encryption parameter and the encryption key, to obtain a decrypted active video packet and a decrypted audio sampling packet.

In a possible design, the video stream includes a plurality of vertical blanking packets, encryption description packets, and key distribution packets that are consecutively and repeatedly sent. The method further includes: selecting, from the plurality of vertical blanking packets, encryption description packets, and key distribution packets that are consecutively and repeatedly sent, a vertical blanking packet, an encryption description packet, and a key distribution packet that pass correctness check.

In a possible design, packet headers of the vertical blanking packet, the encryption description packet, and the key distribution packet each include a retry (Retry) flag, and when the retry flag is 1, it indicates a receive end to check whether the packet is correct and initiate a retransmission request when the packet is incorrect. The method further includes: initiating retransmission of the packet when any one of the vertical blanking packet, the encryption description packet, and the key distribution packet is incorrect.

In a possible design, the method further includes: obtaining video frame control information carried in the vertical blanking packet, where the video frame control information includes a pixel clock parameter; and generating the pixel clock signal based on the video frame control information.

According to a third aspect, an embodiment of this application provides a signal transmission apparatus. The apparatus has a function of implementing the method in the first aspect. The function may be implemented by hardware, or may be implemented by hardware executing corresponding software. The hardware or software includes one or more modules corresponding to the function, for example, includes an interface unit and a processing unit.

In a possible design, the apparatus may be a chip or an integrated circuit.

In a possible design, the apparatus includes a memory and a processor. The memory is configured to store instructions executed by the processor. When the instructions are executed by the processor, the apparatus may perform the method in the first aspect.

In a possible design, the apparatus may be an entire first device.

According to a fourth aspect, an embodiment of this application provides a signal transmission apparatus. The apparatus has a function of implementing the method in the second aspect. The function may be implemented by hardware, or may be implemented by hardware executing corresponding software. The hardware or software includes one or more modules corresponding to the function, for example, includes an interface unit and a processing unit.

In a possible design, the apparatus may be a chip or an integrated circuit.

In a possible design, the apparatus includes a memory and a processor. The memory is configured to store instructions executed by the processor. When the instructions are executed by the processor, the apparatus may perform the method in the second aspect.

In a possible design, the apparatus may be an entire second device.

According to a fifth aspect, an embodiment of this application provides a signal transmission apparatus. The signal transmission apparatus includes an interface circuit and a processor, and the processor and the interface circuit are coupled to each other. The processor is configured to implement the method in the first aspect using a logic circuit or by executing instructions. The interface circuit is configured to: receive a signal from a signal transmission apparatus other than the signal transmission apparatus and transmit the signal to the processor, or send a signal from the processor to a signal transmission apparatus other than the signal transmission apparatus. It may be understood that the interface circuit may be a transceiver, a transceiver machine, a transceiver, or an input/output interface.

Optionally, the signal transmission apparatus may further include a memory, configured to: store instructions executed by the processor, store input data required by the processor to run the instructions, or store data generated after the processor runs the instructions. The memory may be a physically independent unit, or may be coupled to the processor, or the processor includes the memory.

According to a sixth aspect, an embodiment of this application provides a signal transmission apparatus. The signal transmission apparatus includes an interface circuit and a processor, and the processor and the interface circuit are coupled to each other. The processor is configured to implement the method in the second aspect using a logic circuit or by executing instructions. The interface circuit is configured to: receive a signal from a signal transmission apparatus other than the signal transmission apparatus and transmit the signal to the processor, or send a signal from the processor to a signal transmission apparatus other than the signal transmission apparatus. It may be understood that the interface circuit may be a transceiver, a transceiver machine, a transceiver, or an input/output interface.

Optionally, the signal transmission apparatus may further include a memory, configured to: store instructions executed by the processor, store input data required by the processor to run the instructions, or store data generated after the processor runs the instructions. The memory may be a physically independent unit, or may be coupled to the processor, or the processor includes the memory.

According to a seventh aspect, an embodiment of this application provides a communication system. The communication system includes a first device and a second device. The first device may implement the method in the first aspect, and the second device may implement the method in the second aspect.

According to an eighth aspect, an embodiment of this application provides a computer-readable storage medium. The storage medium stores a computer program or instructions. When the computer program or the instructions are executed by a processor, the method in the first aspect or the second aspect can be implemented.

According to a ninth aspect, an embodiment of this application further provides a computer program product, including a computer program or instructions. When the computer program or the instructions are executed by a processor, the method in the first aspect or the second aspect can be implemented.

According to a tenth aspect, an embodiment of this application further provides a chip system. The chip system includes a processor and a memory. The processor is coupled to the memory. The memory is configured to store a program or instructions. When the program or the instructions are executed by the processor, the method in the first aspect or the second aspect can be implemented.

For technical effect that can be achieved in the second aspect to the tenth aspect, refer to technical effect that can be achieved in the first aspect. Details are not described herein again.

BRIEF DESCRIPTION OF DRAWINGS

FIG. 10 is a diagram of a format of a vertical blanking packet according to an embodiment of this application;

FIG. 11 is a diagram of a format of a horizontal blanking packet according to an embodiment of this application;

FIG. 12 is a diagram of a format of an active video packet according to an embodiment of this application;

FIG. 14 is a diagram of an arrangement of pixel components of a video in an RGB format according to an embodiment of this application;

FIG. 15 is a diagram of an arrangement of pixel components of a video in a YCbCr444 format according to an embodiment of this application;

FIG. 16 is a diagram of an arrangement of pixel components of a video in a YCbCr422 format according to an embodiment of this application;

FIG. 18A, FIG. 18B, and FIG. 18C are a diagram 1 of an active video packet according to an embodiment of this application;

FIG. 20A, FIG. 20B, and FIG. 20C are a diagram 2 of an active video packet according to an embodiment of this application;

FIG. 21 is a diagram of a format of a descriptive information packet according to an embodiment of this application;

FIG. 24 is a diagram of an audio sampling packet according to an embodiment of this application;

FIG. 25 is a diagram 2 of a structure of a video packet according to an embodiment of this application;

DESCRIPTION OF EMBODIMENTS

Before embodiments of this application are described, some terms used in this application are first explained and described, to facilitate understanding for a person skilled in the art.

Figure 1:
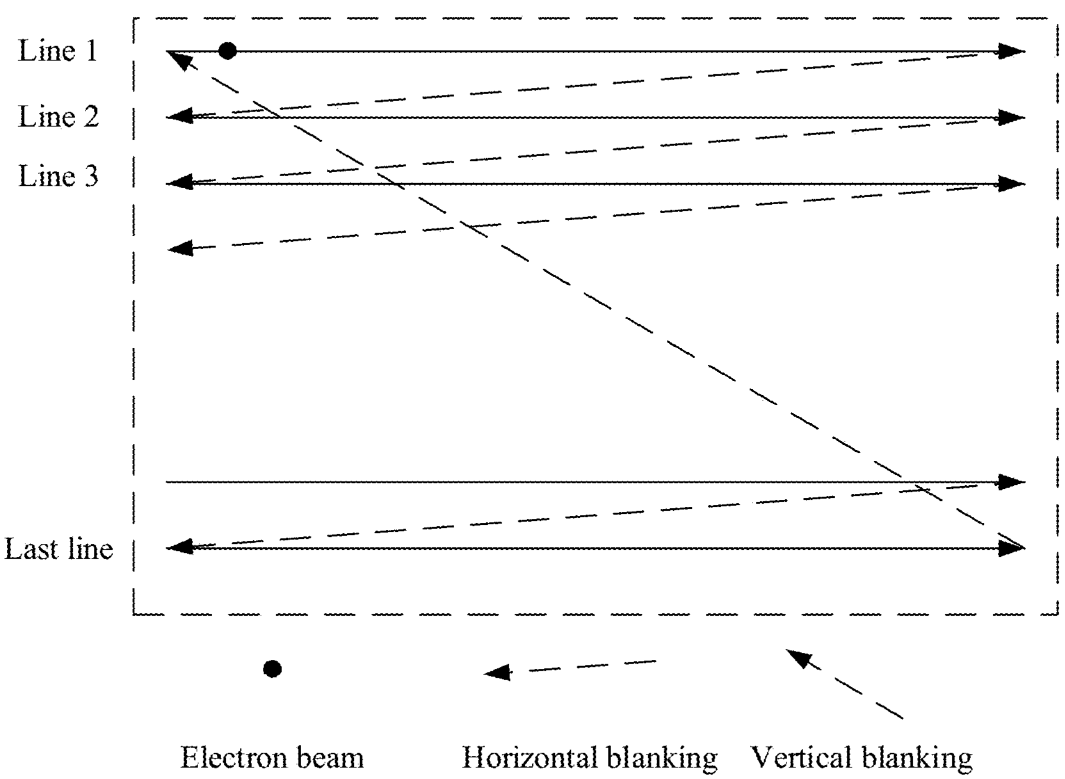
FIG. 1 is a diagram of image display according to an embodiment of this application.

(1) Video signal timing: The video signal timing is derived from a cathode ray tube (cathode ray tube, CRT) display or a television. The display uses an electron gun to emit an electron beam, and the electron beam hits phosphorus powder on a screen, so that the phosphorus powder emits light. Brightness of a pixel is controlled based on intensity of the electronic beam. The electron beam uses a raster scan (raster-scan) technology to implement image display. Refer to a diagram of image display shown in FIG. 1. Before one frame of image starts to be displayed, the electron beam (electron beam) needs to return from a lower right corner to an upper left corner. In this process, the electron beam needs to be blanked (no image is displayed), and this time period is referred to as vertical retrace (vertical retrace). After one line (line) of data is displayed, the electron beam needs to return from a rightmost side of a current line to a leftmost side of a next line. In this process, blanking is also required, and this time period is referred to as horizontal retrace (horizontal retrace).

Figure 2:
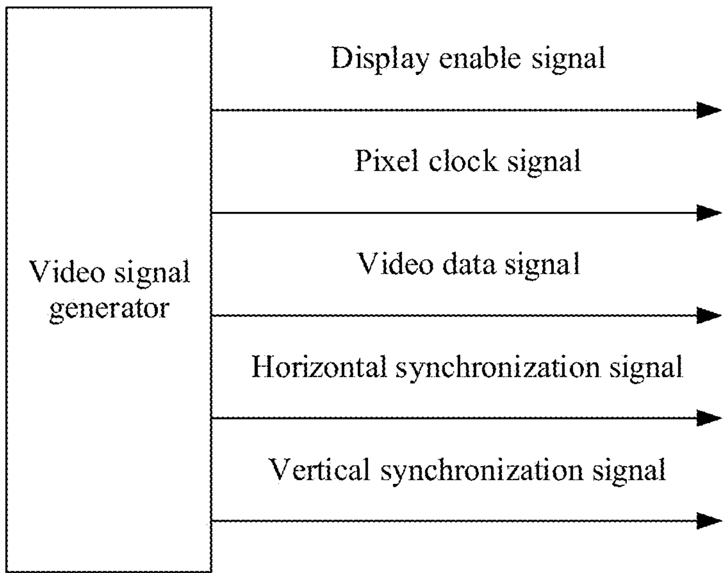
FIG. 2 is a diagram of generating a video signal according to an embodiment of this application.

(2) Video signal: Refer to a diagram of generating a video signal shown in FIG. 2. The video signal generally includes several sub-signals such as a vertical synchronization signal (VSYNC), a horizontal synchronization signal (HSYNC), a display enable signal (DE), a pixel clock signal, and a video data signal (or a pixel data signal). The vertical synchronization signal indicates the start of one frame of video image at a high level. The horizontal synchronization signal indicates the start of one line of video image at the high level. The display enable signal indicates, at the high level, that active video pixel data is transmitted in current pixel data. The video data signal (or the pixel data signal) indicates a pixel data transmission path that usually includes 24/30/36/48 lines (video signal lines), and any transmission path (that is, the video signal line) transmits data corresponding to one pixel in each pixel clock cycle.

Figure 3:
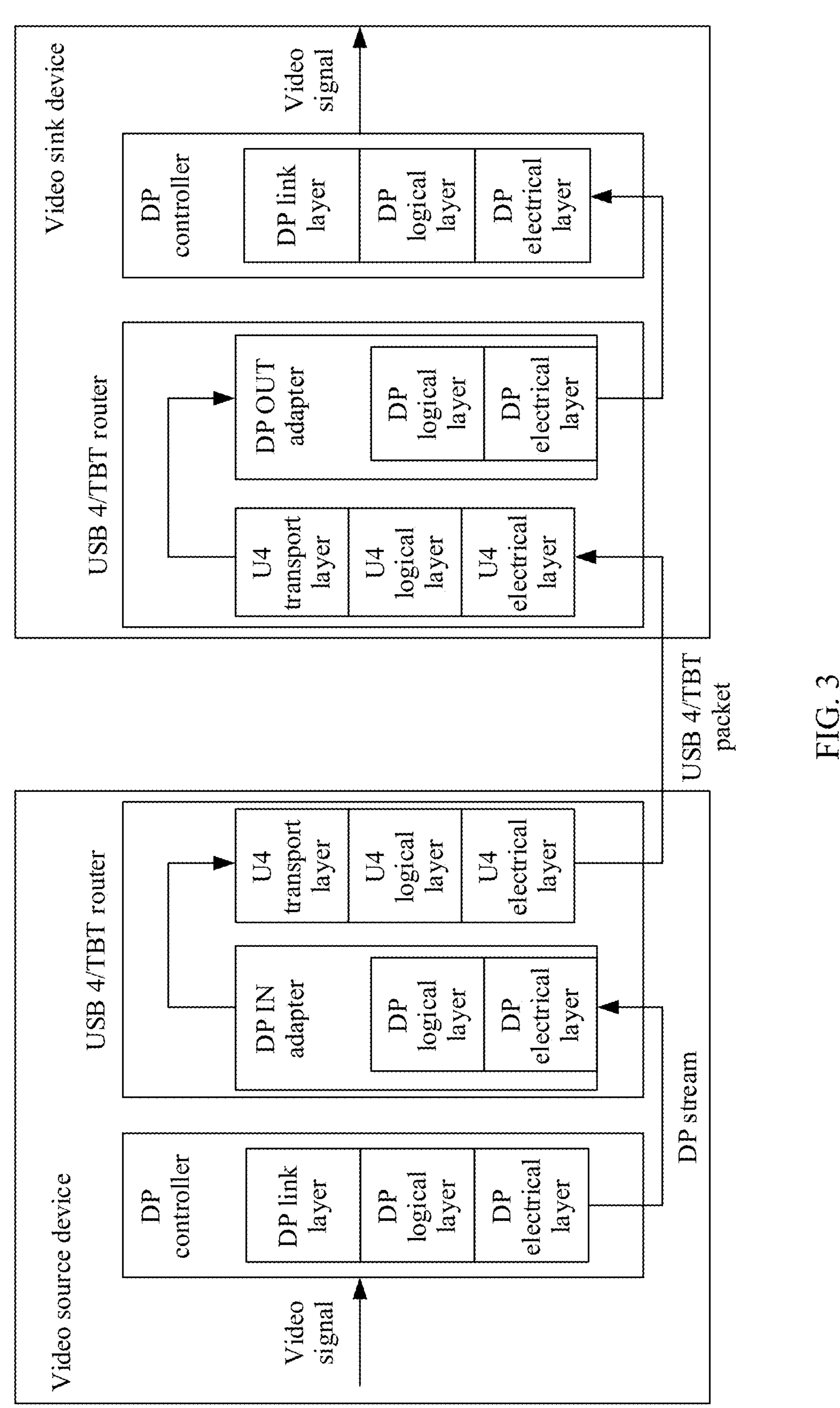
FIG. 3 is a diagram of video transmission according to an embodiment of this application.

Refer to a diagram of video transmission shown in FIG. 3. Currently, when a video signal is transmitted between a video source device and a video sink device, the video signal needs to be first converted into a DP stream using a DP controller in the video source device, then the DP stream is converted into a USB 4/TBT packet using a DP input (IN) adapter in a USB 4/TBT router (router), and then the USB 4/TBT packet is transmitted to the video sink device over a USB 4/TBT network, restored into the DP stream based on a packet using a DP output (OUT) adapter in the USB 4/TBT router of the video sink device, and then restored into the video signal using a DP controller. However, during the foregoing video signal transmission, the video signal needs to be processed by the DP controller and then sent to the USB/TBT adapter for processing. This increases a transmission delay of the video signal. In addition, an additional DP controller needs to be integrated into both the video source device and the video sink device, and a DP electrical layer and a DP logical layer need to be integrated into the adapter, resulting in additional costs and power consumption.

In view of this, this application provides a signal transmission method and apparatus, to directly encapsulate a video signal into a packet for transmission, so as to reduce a transmission delay of the video signal, and reduce costs and power consumption of a video source device and a video sink device.

Figure 4:
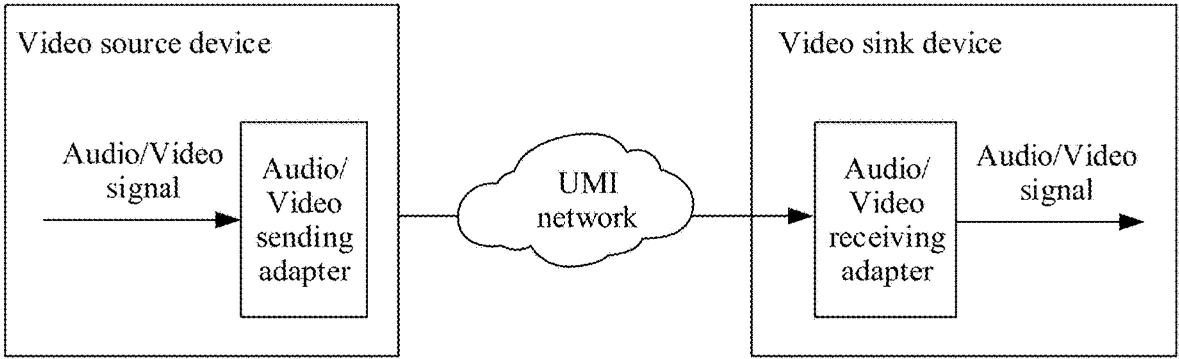
FIG. 4 is a diagram 1 of a signal transmission method according to an embodiment of this application.
Figure 5:
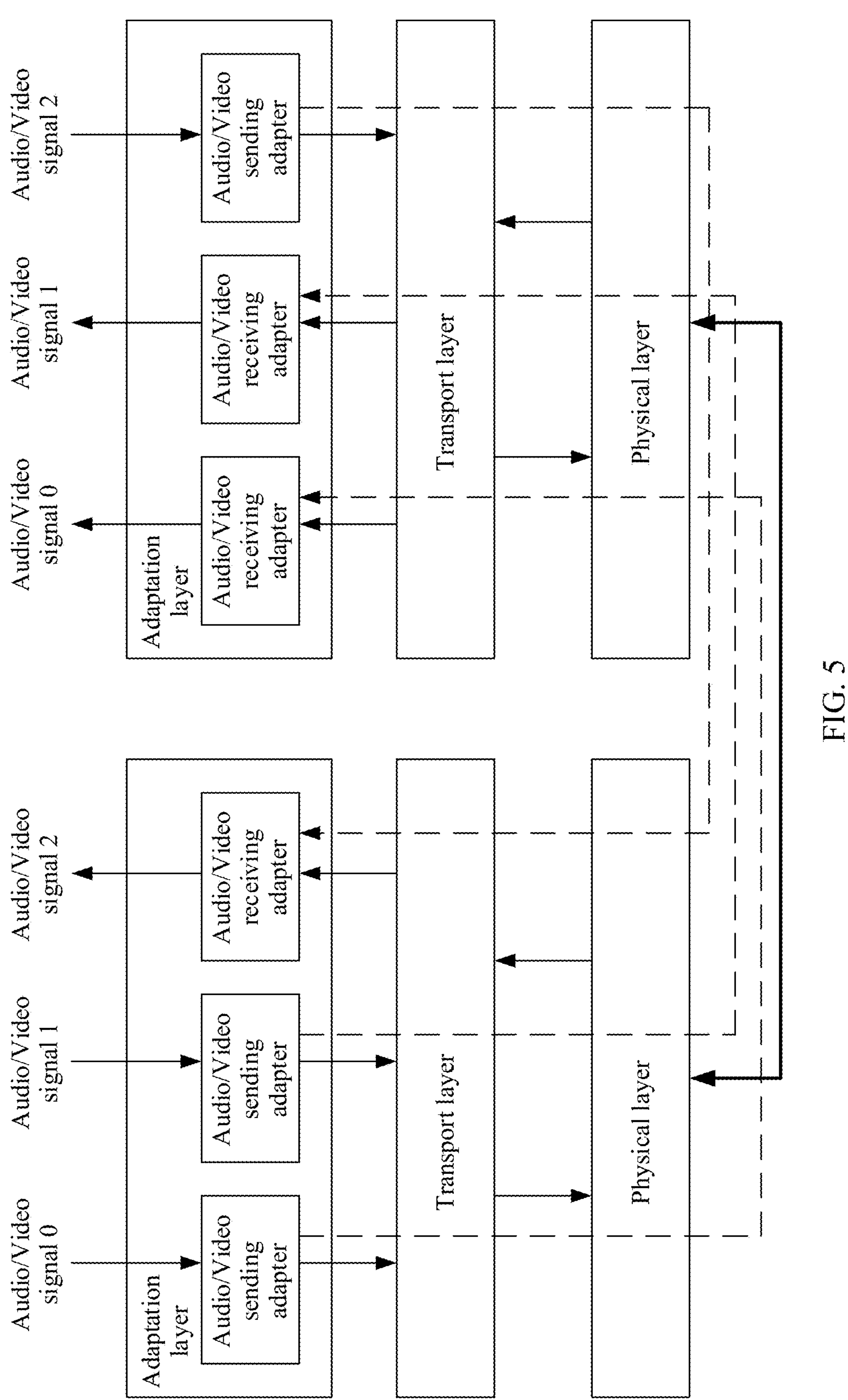
FIG. 5 is a diagram of bidirectional multi-audio/video stream transmission according to an embodiment of this application.

FIG. 4 is a diagram of a signal transmission method according to an embodiment of this application. An audio/video signal may be converted into a unified multimedia interconnection interface (unified multimedia interconnection, UMI) packet using an audio/video sending adapter (or a video sending adapter), the UMI packet is transmitted to a corresponding audio/video receiving adapter (or a video receiving adapter) over a UMI network, and then the UMI packet is converted into the audio/video signal using the audio/video receiving adapter. A UMI standard supports bidirectional multi-audio/video service stream transmission. An arrangement of audio/video data at an adaptation layer is irrelevant to a transport layer. UMI-based bidirectional multi-audio/video stream transmission may be shown in FIG. 5. An adaptation layer may include one or more audio/video sending adapters and one or more audio/video receiving adapters. An audio/video signal is encapsulated into a UMI packet using the audio/video sending adapter at the adaptation layer, then an audio/video stream formed by the UMI packet is transmitted via a transport layer and a physical layer (including an electrical layer and a logical layer) and received by the audio/video receiving adapter at a receive end, and the UMI packet is converted into the audio/video signal using the audio/video receiving adapter. It should be understood that, in embodiments of this application, the audio/video signal is not limited to being transmitted through the UMI, and may also be used in a universal high-speed data transmission interface like a PCIe. The following describes in detail embodiments of this application with reference to accompanying drawings.

In addition, it should be understood that ordinal numbers such as "first" and "second" mentioned in embodiments of this application are used to distinguish between a plurality of objects, and are not used to limit sizes, content, a sequence, a time sequence, priorities, importance degrees, or the like of the plurality of objects. For example, a first device and a second device do not indicate different priorities, importance degrees, or the like corresponding to the two devices.

In embodiments of this application, unless otherwise specified, a quantity of nouns indicates "a singular noun or a plural noun", that is, "one or more". "At least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. For example, A/B indicates A or B. "At least one of the following items (pieces)" or a similar expression thereof indicates any combination of these items, including a single item (piece) or any combination of a plurality of items (pieces). For example, at least one item (piece) of a, b, or c indicates: a, b, c, a and b, a and c, b and c, or a, b, and c, where a, b, and c may be singular or plural.

Figure 6:
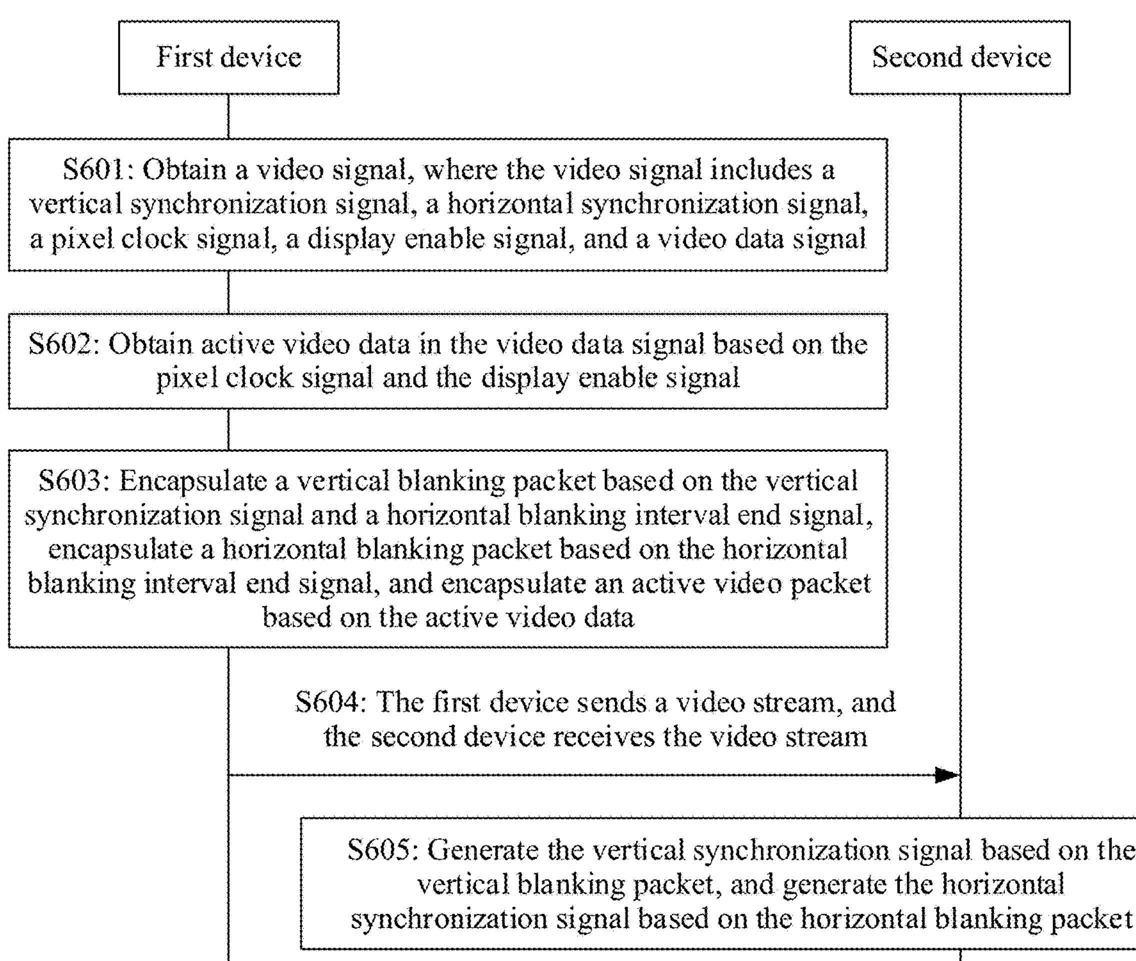
FIG. 6 is a diagram 2 of a signal transmission method according to an embodiment of this application.

FIG. 6 is a diagram of a signal transmission method according to an embodiment of this application. In FIG. 6, an example in which a first device and a second device are used as execution bodies is used to illustrate the method. The first device may be a video source device like a set-top box or a game console, and the second device may be a video sink device like a display or a television. Alternatively, the first device may be a terminal device, a computer, a portable computer, or the like that sends a video signal, and the second device may be a terminal device, a computer, a portable computer, or the like that receives the video signal. An execution body of the method is not limited in this application. For example, the first device in FIG. 6 may alternatively be a component (for example, a processor, a chip, or a chip system) of the first device, or an apparatus used together with the first device; and the second device in FIG. 6 may alternatively be a component (for example, a processor, a chip, or a chip system) of the second device, or an apparatus used together with the second device. The method includes the following steps.

S601: The first device obtains a video signal, where the video signal includes a vertical synchronization signal, a horizontal synchronization signal, a pixel clock signal, a display enable signal, and a video data signal.

S602: The first device obtains active video data in the video data signal based on the pixel clock signal and the display enable signal.

S603: The first device encapsulates a vertical blanking packet based on the vertical synchronization signal and a horizontal blanking interval (HBlank) end signal, encapsulates a horizontal blanking packet based on the HBlank end signal, and encapsulates an active video packet based on the active video data.

In some implementations, the horizontal blanking interval end signal may also be referred to as a horizontal blanking end signal.

S604: The first device multiplexes the vertical blanking packet, the horizontal blanking packet, and the active video packet into a video stream, and sends the video stream. Correspondingly, the second device receives the video stream.

In this embodiment of this application, the video signal may be generated by the first device, for example, generated by a video signal generator in the first device, or may be obtained by the first device from another device. This is not limited in this application.

Figure 7:
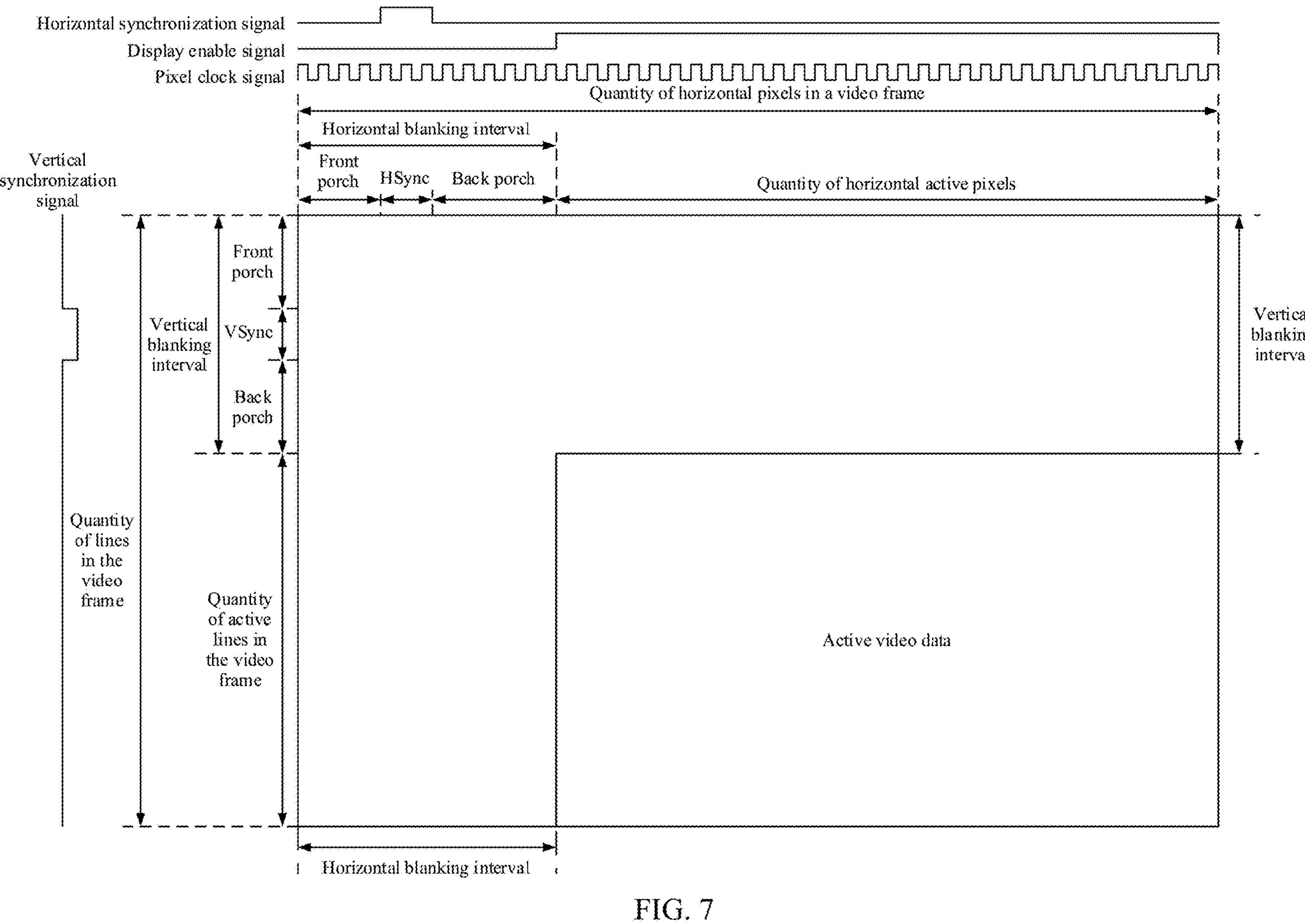
FIG. 7 is a diagram of video signal timing parameters according to an embodiment of this application.

FIG. 7 shows an example of video signal timing parameters according to an embodiment of this application. The video signal includes the following video sub-signals: the horizontal synchronization signal (HSYNC), the vertical synchronization signal (VSYNC), the display enable signal (DE), the pixel clock signal, and the video data signal (a rectangular region in FIG. 7). The video signal timing parameter refers to a temporal relationship between the video sub-signals. Specific timing parameters are shown in Table 1.

TABLE 1

| Content | Description |
|---|---|
| HTotal | Quantity of horizontal pixels in a video frame. Unit: pixel |
| VTotal | Quantity of lines in a video frame. Unit: line |
| PixelClockFreq | Pixel clock signal frequency |
| HP | Horizontal synchronization polarity (HSyncPol)<br>0b: HSync is at a high level (positive).<br>1b: HSync is at a low level (negative). |
| VP | Vertical synchronization polarity (VSyncPol)<br>0b: VSync is at a high level (positive).<br>1b: VSync is at a low level (negative). |
| HActivePixels (HActive) | Quantity of horizontal active pixels. Unit: pixel |
| HBlankPixels (HBlank) | Quantity of pixels in a horizontal blanking interval. Unit: pixel |
| HFrontPorch | Quantity of pixels in a front porch of the horizontal blanking interval. Unit: pixel |
| HSyncPixels (HSync) | Quantity of HSync pixels. Unit: pixel |
| HBackPorch | Quantity of pixels in a back porch of the horizontal blanking interval. Unit: pixel<br>HBackPorch = HBlankPixels − HFrontPorch − HSyncPixels |
| VActiveLines (VActive) | Quantity of active lines in the video frame. Unit: line |
| VBlankLines (VBlank) | Quantity of lines in a vertical blanking interval. Unit: line |
| VFrontPorch | Quantity of lines in a front porch of the vertical blanking interval. Unit: line |
| VSyncLines (VSync) | Quantity of VSync lines. Unit: line |
| VBackPorch | Quantity of lines in a back porch of the vertical blanking interval. Unit: line<br>VBackPorch = VBlankLines − VFrontPorch − VSyncLines |

Each transmission path of the video data signal (or the pixel data signal) transmits, in each pixel clock cycle, data corresponding to one pixel. With reference to the example of the video signal timing parameters shown in FIG. 7, it can be seen that no active pixel is transmitted in the video data signal (or the pixel data signal) in the vertical blanking interval and the horizontal blanking interval. When the display enable signal is at a high level, it indicates that active video pixel data is transmitted in current pixel data. Therefore, in this embodiment of this application, active video data (that is, active pixel data) in the video data signal may be obtained based on the pixel clock signal and the display enable signal, to reduce a transmission bandwidth of the video signal.

Figure 8:
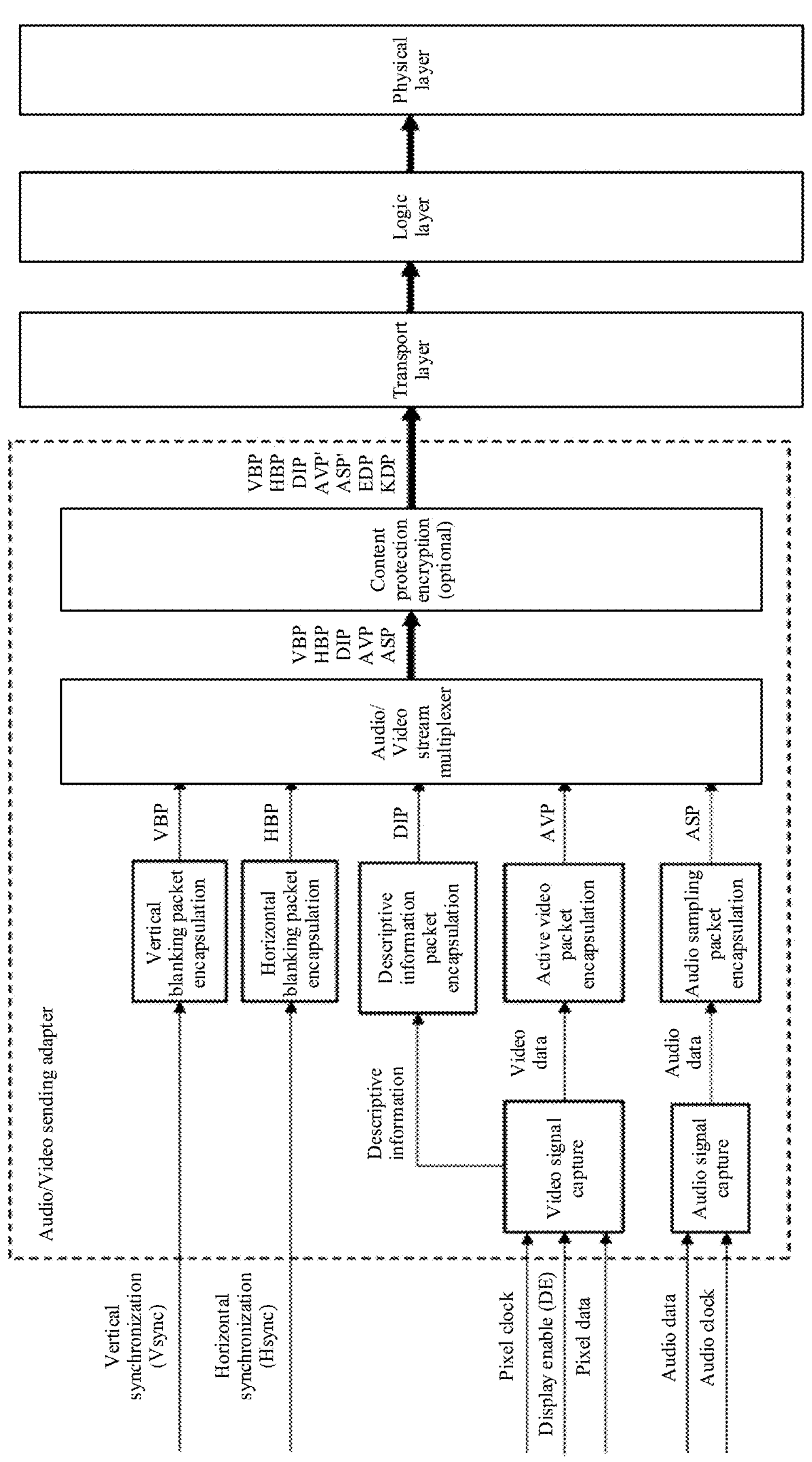
FIG. 8 is a logical diagram 1 of a video sending adapter according to an embodiment of this application.

Refer to a logical diagram of a video (or audio/video) sending adapter shown in FIG. 8. After obtaining the video signal, the first device (or the video sending adapter in the first device) may obtain (or capture) the active video data in the video data signal based on the pixel clock signal and the display enable signal, and encapsulate the active video packet (active video packet, AVP) based on the active video data, where the active video packet AVP may carry the active video data. In addition, the first device may further encapsulate the vertical blanking packet (vertical blanking packet, VBP) based on the vertical synchronization signal, and encapsulate the horizontal blanking packet (horizontal blanking packet, HBP) based on the horizontal synchronization signal. For example, when the vertical synchronization signal is changed from the low level to the high level, the vertical blanking packet VBP is generated, to indicate the start of the vertical synchronization signal, that is, indicate the start of one frame of video image; and when the DE signal is changed from a low level to a high level, the horizontal blanking packet HBP is generated, to indicate the start of one line of video image.

In some implementations, the first device may further obtain (or capture) descriptive information in the blanking interval (for example, the vertical blanking interval and the horizontal blanking interval) in the video data signal based on the pixel clock signal and the display enable signal, and encapsulate a descriptive information packet (descriptive information packet, DIP) based on the descriptive information, where the descriptive information packet DIP may carry the descriptive information. The first device may further multiplex (for example, using a stream multiplexer or the like) the descriptive information packet DIP into the video stream for sending.

In addition, to further improve security of video data transmission, the first device may further enable content protection (for example, encryption), encrypt the active video packet AVP (for example, perform advanced digital content protection technology (advanced digital content protection, ADCP) encryption or the like), encapsulate a key distribution packet (key distribution packet, KDP) based on an encryption key used during encryption, encapsulate an encryption description packet (encryption description packet, EDP) based on an encryption parameter like an encryption algorithm/encryption mode used during encryption, multiplex (for example, using the stream multiplexer) an encrypted active video packet AVP', the descriptive information packet, the key distribution packet KDP carrying encryption key information, the encryption description packet EDP carrying the encryption parameter, the vertical blanking packet VBP, the horizontal blanking packet HBP, and the like into the video stream for sending. For example, the video stream may be sent over a UMI network, for example, sent to the second device for receiving (or a video receiving adapter in the second device) via a transport layer and a physical layer (including an electrical layer and a logical layer) of a UMI.

It should be understood that, if the encryption parameter or the encryption key is agreed on or pre-negotiated between the first device and the second device, the video stream may alternatively not include the encryption description packet EDP and the key distribution packet KDP.

In this embodiment of this application, that a plurality of types of packets are multiplexed (for example, using the stream multiplexer or the like) into the video stream may mean that the plurality of types of packets are transmitted via one video stream, and an identifier of the video stream may be carried in each of the plurality of types of packets. For example, the multiplexing the vertical blanking packet, the horizontal blanking packet, and the active video packet into a video stream may mean that the vertical blanking packet, the horizontal blanking packet, and the active video packet are transmitted via one video stream, where the video stream includes the vertical blanking packet, the horizontal blanking packet, and the active video packet, and an identifier of the video stream may be carried in each of the vertical blanking packet, the horizontal blanking packet, and the active video packet.

In some embodiments, for an audio signal (or audio data), the first device may encapsulate the audio signal (or audio data) and the descriptive information together, for example, encapsulate the audio signal (or audio data) and the descriptive information into the descriptive information packet DIP. Certainly, to facilitate processing of the audio signal by the receive end, the first device may separately transmit the audio signal (or audio data) and the descriptive information. Refer to the logical diagram of the video sending adapter shown in FIG. 8. The first device may encapsulate the descriptive information packet DIP based on only the descriptive information, and may separately encapsulate an audio sampling packet (audio sample packet, ASP) based on the audio signal, where the audio sampling packet ASP carries information about the audio signal (or audio data corresponding to the audio signal). Optionally, the first device may further encrypt the audio sampling packet ASP based on a transmission requirement, and transmit an encrypted audio sampling packet ASP'.

In addition, the first device may also encrypt one or more packets of the active video packet AVP and the audio sampling packet ASP based on a requirement. In an example, when encapsulating the active video packet AVP, the audio sampling packet ASP, and the like, the first device may set a content protection flag (for example, a CP flag) in a packet header to 1 or 0 based on a content protection (for example, encryption) requirement, and the first device (for example, a content protection module in the first device) may perform processing based on the CP flag in the packet header. If the CP flag is 1, the packet is to be encrypted; or if the CP flag is 0, the packet is not to be encrypted.

Figure 9:
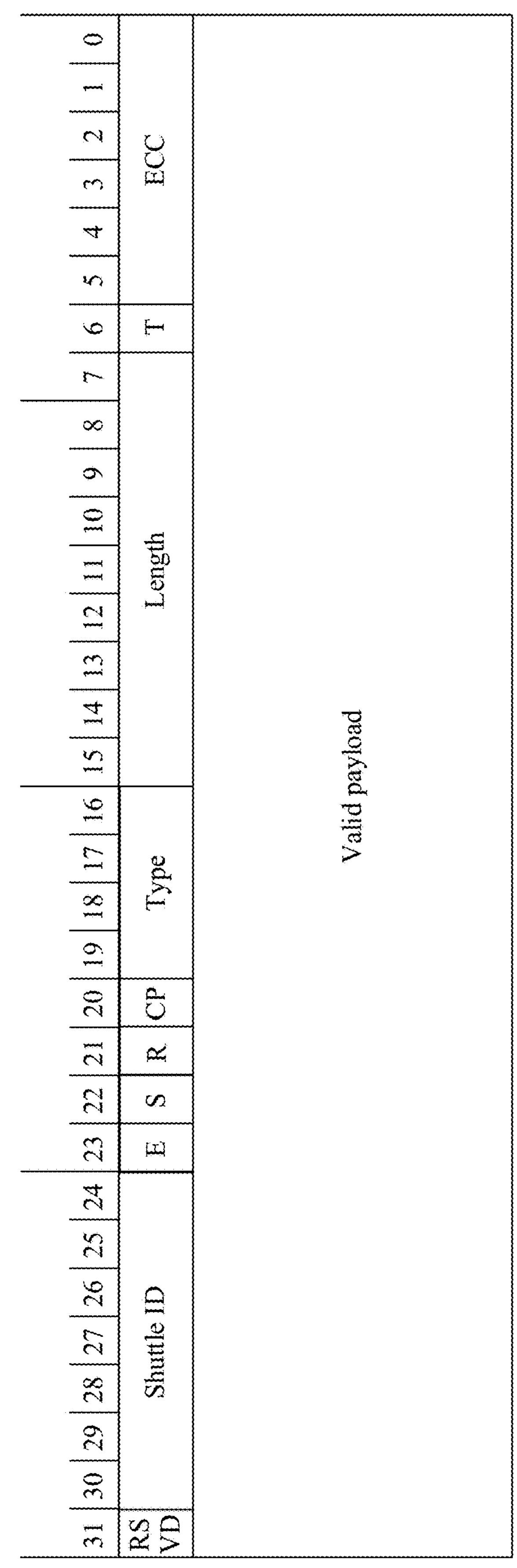
FIG. 9 is a diagram 1 of a structure of a video packet according to an embodiment of this application.

In a possible implementation, a structure of the video packet (like the vertical blanking packet, the horizontal blanking packet, or the active video packet) in the video stream may be shown in FIG. 9. The video packet may include a 4-byte (32 bits (bits) in total) packet header and a valid payload (payload) part. Meanings of fields in the packet header of the video packet may be shown in Table 2.

TABLE 2

| Field | Length (Bits) | Description |
|---|---|---|
| ECC | 6 | Error correction code |
| T | 1 | is a tunnel packet or not.<br>0: link packet<br>1: tunnel packet (USB/video/PCIe) |
| Length (Length) | 9 | Packet length (excluding the tunnel packet header) with a value ranging from 0 to 508 |
| Type (Type) | 4 | Packet type whose specific meaning is defined by the Adapter, for example, a video:<br>4b'0000: undefined<br>4b'0001: vertical blanking packet VBP<br>4b'0010: horizontal blanking packet HBP<br>4b'0011: descriptive information packet DIP<br>4b'0100: audio sampling packet ASP<br>4b'0101: active video packet AVP<br>4b'0110 to 4b'1101: reserved<br>4b'1110: encryption description packet EDP<br>4b'1111: key distribution packet KDP |
| Flags | 4 | Flag field whose meaning is defined by the Adapter, for example, a video:<br>CP: content protection flag. 0: unprotected. 1: ADCP protection<br>R: reserved, fixed to 0<br>S: packet start flag, which is a 1$^{st}$ packet flag in one line of pixels of the active video packet or a first packet flag of the descriptive information packet<br>E: packet end flag, which is a last packet flag in one line of pixels of the active video or a last packet flag of the descriptive information packet |
| Shuttle (Shuttle) ID | 7 | identifies one data transmission path on a link (Link), and has a value ranging from 0 to 127.<br>For the audio/video adapter, this field indicates an adapter ID set before delivery. |
| RSVD | 1 | Reserved |

The video packet may be classified into the vertical blanking packet VBP, the horizontal blanking packet HBP, the descriptive information packet DTP, the active video packet AVP, the encryption description packet EDP, the key distribution packet KDP, and the like based on a packet type (or function).

(1) Vertical blanking packet (VBP): The vertical blanking packet is used to transmit a VBS signal, namely, a vertical blanking start signal (a vertical blanking signal is changed from a low level to a high level). The vertical blanking packet VBP indicates the start of a frame. A format of the vertical blanking packet VBP may be shown in FIG. 10, and includes a packet header of 4 bytes and a message body of 28 bytes, that is, 32 bytes in total. After receiving the VBS signal, the first device (for example, the video sending adapter in the first device) immediately generates the vertical blanking packet VBP. Meanings of fields in the packet header of the vertical blanking packet VBP may be shown in Table 3.

TABLE 3

| Field | Length (Bits) | Description |
|---|---|---|
| ECC | 6 | Error correction code |
| T | 1 | is fixed to 1, and indicates a tunnel packet. |
| Length (Length) | 9 | is fixed to 28. |
| Type (Type) | 4 | is fixed to 4b'0001 (corresponding to 1 in FIG. 10), and indicates that the packet is the vertical blanking packet VBP. |

TABLE 3-continued

| Field | Length (Bits) | Description |
|---|---|---|
| Flags | 4 | CP: content protection flag, fixed to "0: unprotected"<br>R: reserved, fixed to 0<br>S: packet start flag, fixed to 1<br>E: packet end flag, fixed to 1 |
| Shuttle (Shuttle) ID | 7 | identifies one data transmission path on a link (Link), and has a value ranging from 0 to 127. For the audio/video adapter, this field indicates an adapter ID set before delivery. |
| RSVD | 1 | Reserved |

The message body (that is, a valid payload part) of the vertical blanking packet VBP may carry frame-level control (video frame control, VFC) information for describing information related to the video frame, and the VFC may carry information such as timing, color space, and a color depth of the current video frame. The message body (that is, the VFC information) of the vertical blanking packet may be shown in Table 4, and includes information such as a quantity of horizontal active pixels (HActivePixels), a quantity of pixels in the horizontal blanking interval (HBlankPixels), a quantity of pixels in a front porch of the horizontal blanking interval (HFrontPorch), a quantity of HSync pixels (HSyncPixels), a quantity of active lines of the video frame (VActiveLines), a quantity of lines in the vertical blanking interval (VBlankLines), a quantity of lines in a front porch of the vertical blanking interval (VFrontPorch), and a quantity of VSync lines (VSyncLines).

TABLE 4

| Field | Length (Bits) | Description |
|---|---|---|
| VFC__VER | 6 | Format version of the video frame-level control information<br>Default: 0x01, and other values: reserved |
| C | 1 | Video compression mode (CompressVideoMode)<br>0b: uncompressed video<br>1b: compressed video |
| M | 1 | Mute video flag (MuteVideoFlag)<br>This bit is set to 1 when a mute video needs to be output for a video.<br>When receiving a video frame whose MuteVideoFlag is 1, the sink device needs to identify that muting is required for the current frame.<br>It is recommended that a method for processing a static frame by the sink device is to screen off or display a previous frame. |
| Pixel format (PixelFormat) | 4 | Data arrangement format:<br>00h: RGB<br>01h: YCbCr 4:4:4<br>02h: YCbCr 4:2:2<br>03h: YCbCr 4:2:0<br>04h: Y-Only<br>05h: ARGB<br>06h: Raw Data<br>07h to 0Fh: reserved |
| Reserved | 4 | Reserved |
| ColoriMetry | 5 | Pixel color gamut<br>RGB/ARGB:<br>00h: sRGB<br>01h: $Adobe_{RGB}$<br>02h: ITU-R BT.2020 R'G'B'<br>03h: DCI-P3 R'G'B' (D65)<br>04h: DCI-P3 R'G'B' (theater)<br>05h to 1Fh: reserved<br>YCbCr 4:4:4/YCbCr 4:2:2/YCbCr 4:2:0:<br>00h: ITU-R BT.601<br>01h: ITU-R BT.709<br>02h: $Adobe_{YCC601}$<br>03h: ITU-R BT.2020 $Y'_{C}C'_{BC}C'_{RC}$<br>04h: ITU-R BT.2020 $Y'C_{B}'C_{R}'$<br>05h to 1Fh: reserved<br>Y-Only:<br>00h: DICOM PART#14 greyscale standard display<br>01h to 1Fh: reserved<br>RAW:<br>00h: customized configuration<br>01h to 1Fh: reserved |
| Reserved | 3 | Reserved |
| BitsPerComp | 5 | Component bit width:<br>0x08: 8 bits<br>0x0A: 10 bits<br>0x0C: 12 bits<br>0x10: 16 bits<br>Other values: reserved |
| Reserved | 3 | Reserved |
| PixelClockFreq | 30 | Pixel clock frequency of the video stream<br>The unit is 1 kHz, and a frequency offset is less than 500 ppm. |
| HP | 1 | Horizontal synchronization polarity (Hsync Polarity)<br>0b: Hsync is at a high level.<br>1b: Hsync is at a low level. |
| VP | 1 | Vertical synchronization polarity<br>0b: Vsync is at a high level.<br>1b: Vsync is at a low level. |
| HActivePixels | 16 | Quantity of horizontal active pixels. Unit: pixel |
| HBlankPixels | 16 | Quantity of pixels in a horizontal blanking interval. Unit: pixel |
| HFrontPorch | 16 | Quantity of pixels in the front porch of the horizontal blanking interval. Unit: pixel |
| HsyncPixels | 16 | Quantity of Hsync pixels. Unit: pixel |
| VActiveLines | 16 | Quantity of active lines in one frame. Unit: line |
| VBlankLines | 16 | Quantity of lines in a vertical blanking interval. Unit: line |
| VFrontPorch | 16 | Quantity of lines in the front porch of the vertical blanking interval. Unit: line |
| VsyncLines | 16 | Quantity of Vsync lines. Unit: line |
| CRC32 | 32 | CRC check |

(2) Horizontal blanking packet HBP: The horizontal blanking packet HBP may be used to transmit a line start signal, and the first device (for example, the video sending adapter in the first device) immediately generates the horizontal blanking packet HBP when HBlank ends. A format of the horizontal blanking packet HBP may be shown in FIG. 11. The horizontal blanking packet may have only a packet header, and meanings of fields in the packet header may be shown in Table 5.

TABLE 5

| Field | Length (Bits) | Description |
|---|---|---|
| ECC | 6 | Error correction code |
| T | 1 | is fixed to 1, and indicates a tunnel packet. |
| Length (Length) | 9 | is fixed to 8. |
| Type (Type) | 4 | is fixed to 4b'0010 (corresponding to 2 in FIG. 11), and indicates that the packet is the horizontal blanking packet HBP. |
| Flags | 4 | CP: content protection flag, fixed to "0: unprotected"<br>R: reserved, fixed to 0<br>S: packet start flag, fixed to 1<br>E: packet end flag, fixed to 1 |

TABLE 5-continued

| Field | Length (Bits) | Description |
|---|---|---|
| Shuttle (Shuttle) ID | 7 | identifies one data transmission path on a link (Link), and has a value ranging from 0 to 127. For the audio/video adapter, this field indicates an adapter ID set before delivery. |
| RSVD | 1 | Reserved |

(3) Active video packet AVP: The active video packet AVP is used to transmit the active video data (which may also be referred to as the active video pixel data) in the video signal. A format of the active video packet AVP may be shown in FIG. 12. The active video packet may include two parts: a packet header (4 bytes) and a payload part (which is used to carry the active video data, namely, the active video pixel data). Meanings of fields in the packet header of the vertical blanking packet may be shown in Table 6.

TABLE 6

| Field | Length (Bits) | Description |
|---|---|---|
| ECC | 6 | Error correction code |
| T | 1 | is fixed to 1, and indicates a tunnel packet. |
| Length (Length) | 9 | Packet length (excluding a tunnel packet header) with a value ranging from 0 to 508 |
| Type (Type) | 4 | is fixed to 4b'0101 (corresponding to 5 in FIG. 12), and indicates that the packet is the active video packet AVP |
| Flags | 4 | Flag field whose meaning is defined by the Adapter, for example, a video: CP: content protection flag. 0: unprotected. 1: ADCP protection R: reserved, fixed to 0 S: packet start flag, which is a 1$^{st}$ packet flag in one line of pixels of the active video packet E: packet end flag, which is a last packet flag in one line of pixels of the active video |
| Shuttle (Shuttle) ID | 7 | identifies one data transmission path on a link (Link), and has a value ranging from 0 to 127. For the audio/video adapter, this field indicates an adapter ID set before delivery. |
| RSVD | 1 | Reserved |

Figure 13:
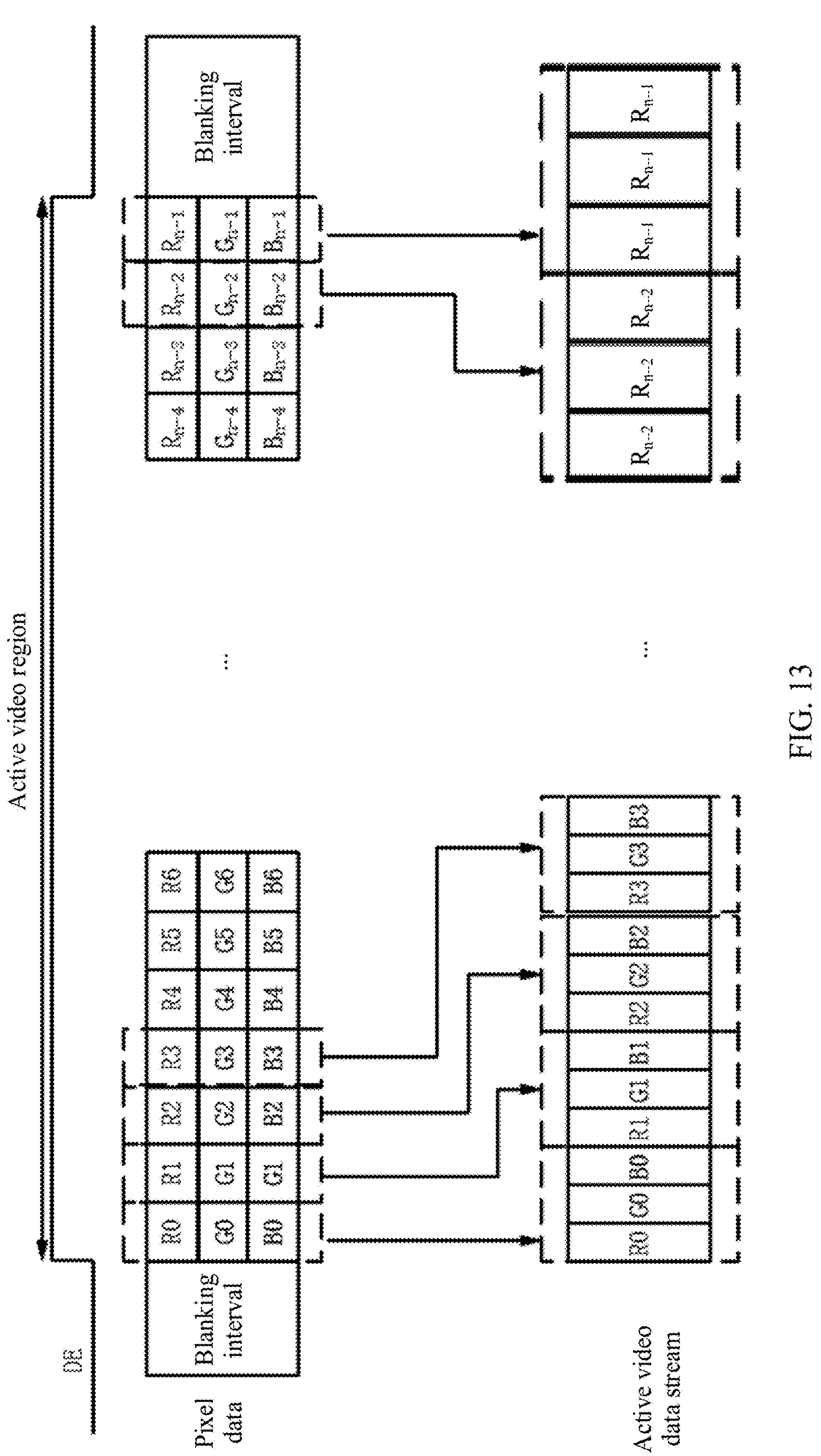
FIG. 13 is a diagram of an arrangement of active video data according to an embodiment of this application.

The following arrangement rule may be used for pixel components in the active video data: For consecutive video pixels, the first device (or a video adaptation module in the first device) may preferentially arrange pixel data at a first location, and then arrange pixel data following the first location according to a receiving sequence. In an example, when the video signal is a red, green, blue (red, green, blue, RGB) video, an arrangement of the active video data carried in the active video packet may be shown in FIG. 13. Pixel represents a pixel. For pixels in each line, the first device may sequentially arrange the pixels in the line starting from a 0$^{th}$ pixel, until a last pixel in the line ends.

For an arrangement of pixel components in a video in an RGB format, refer to a diagram of an arrangement of pixel components in a video in an RGB format shown in FIG. 14. The first device (for example, the video adaptation module in the first device) may first arrange R components, then arrange G components, and finally arrange B components.

For an arrangement of pixel components in a video in a YCbCr444 format, refer to a diagram of an arrangement of pixel components in a video in a YCbCr444 format shown in FIG. 15, where Y represents a luminance component, Cb represents a blue chroma component, and Cr represents a red chroma component. The first device (for example, the video adaptation module in the first device) may first arrange Y components, then arrange Cb components, and finally arrange Cr components.

For a video in a YCbCr422 format, refer to a diagram of an arrangement of pixel components in a video in a YCbCr422 format shown in FIG. 16. The first device (for example, the video adaptation module in the first device) may preferentially arrange a Y component of a 0$^{th}$ pixel and a Cb component of the 0$^{th}$ pixel point, then arrange a Y component of a 1$^{st}$ pixel and a Cr component of the 1$^{st}$ pixel, then arrange a Y component of a 2$^{nd}$ pixel and a Cb component of the 2$^{nd}$ pixel, . . . , and arrange a Y component of an n$^{th}$ pixel and a Cb component of the n$^{th}$ pixel.

For a video in a YCbCr420 format, the first device (for example, the video adaptation module in the first device) may preferentially arrange two Y components, and then arrange Cb or Cr components according to even-number and odd-number lines, that is, arrange a Cb component in an even-number line and then arrange a Cr component in an odd-number line.

The payload part of the active video packet AVP is used to transmit the active video pixel data or compressed video pixel data, and a length of the payload part may not exceed 508 bytes. When active video data at the end of a line cannot be 4-byte aligned, the first device (for example, the video adaptation module in the first device) may pad data "0" to perform structural alignment, to ensure 4-byte alignment of the data payload part of the active video packet AVP. The second device (for example, a video adaptation module in the second device) at the receive end may identify and discard the padding data based on a quantity of horizontal active pixels (HActivePixels) in the VFC.

Figure 17:
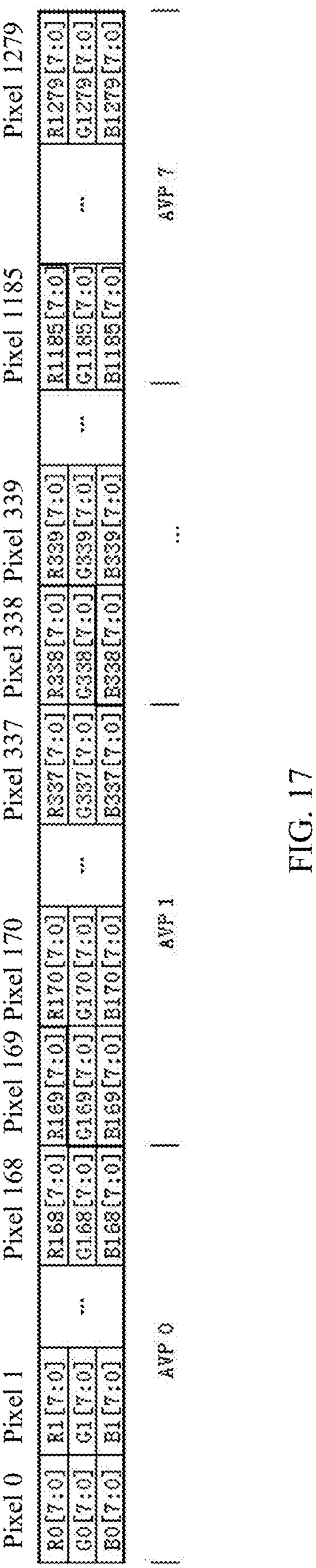
FIG. 17 is a diagram 1 of a data arrangement of a video according to an embodiment of this application.

In an example, an RGB video with a resolution of 1280×720, a frame rate of 60 (P60), and a 24-bit resolution (bit resolution, bpp) is used as an example. A data arrangement of the video is shown in FIG. 17. Aline length of an active video region is 1280 pixels (pixel). In pixel components, R[7], G[7], and B[7] are most significant bits, and R[0], G[0], and B[0] are least significant bits. FIG. 17 shows pixel components of only some pixels. Each line of a video frame has 1280 pixels, each pixel has 24 bits, and each line has 3840 bytes. One active video packet AVP can carry a maximum of 508 bytes of active video pixel data, and eight active video packets AVPs are required to transmit 1280 pixels (3840 bytes). A first AVP (AVP 0) is used for transmission of a pixel 0 to an R component of a pixel 169; an AVP 1 is used for transmission of a G component of the pixel 169 to a G component of a pixel 338; . . . ; and an AVP 7 is used for transmission of a G component of a pixel 1185 to a pixel 1279. Refer to a diagram of active video packets AVPs shown in FIG. 18A to FIG. 18C. An S flag in a packet header of the active video packet AVP 0 needs to be set to 1, to indicate that the active video packet AVP is a 1$^{st}$ active video packet AVP in this line; an E flag in the active video packet AVP 7 needs to be set to 1, to indicate that the active video packet AVP is a last active video packet AVP in this line; and an S flag and an E flag in a packet header of an intermediate active video packet AVP (for example, the active video packet AVP 1) need to be set to 0, to indicate that the active video packet is an intermediate active video packet AVP.

Figure 19:
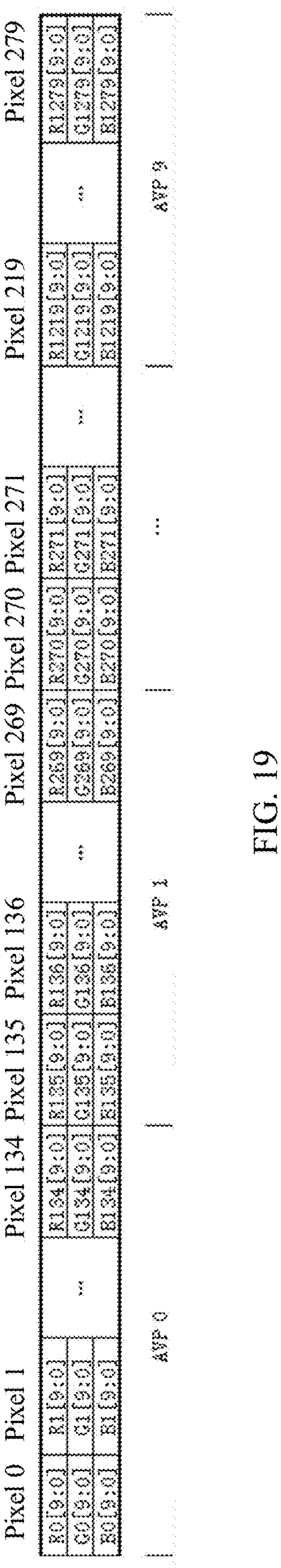
FIG. 19 is a diagram 2 of a data arrangement of a video according to an embodiment of this application.
Figure 20B:
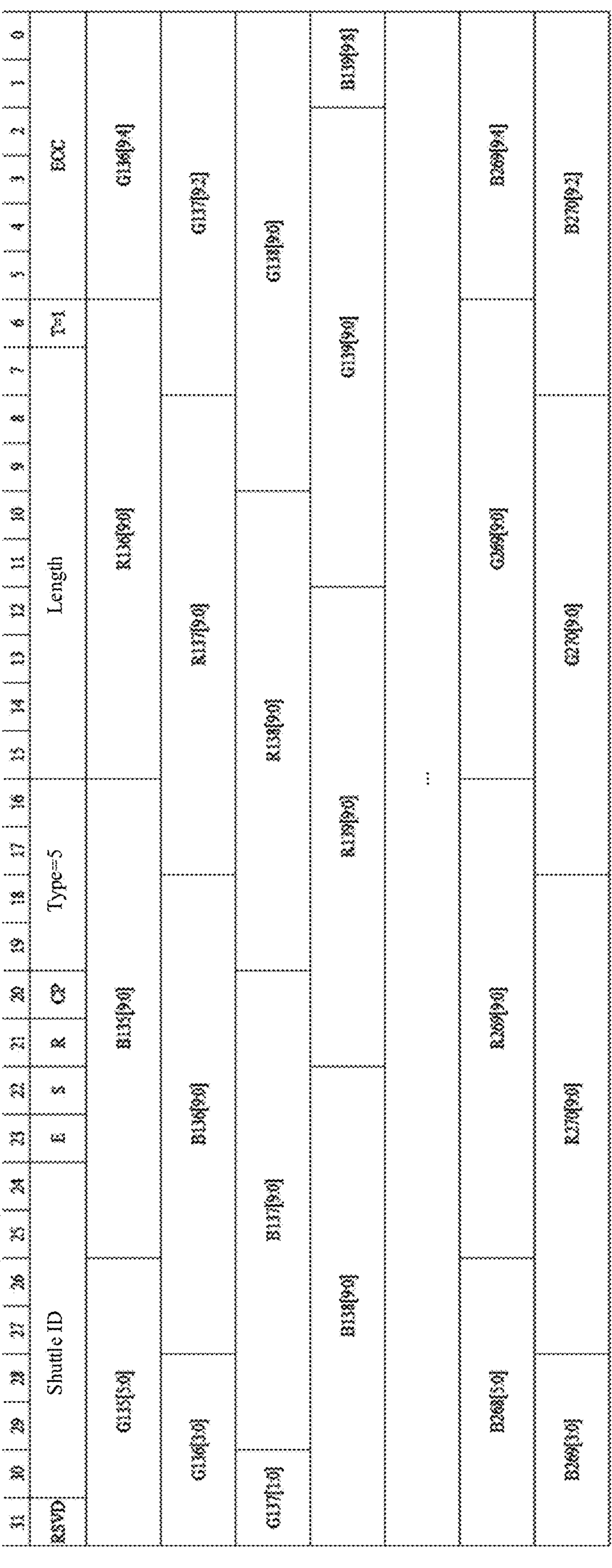
Figure 20C:
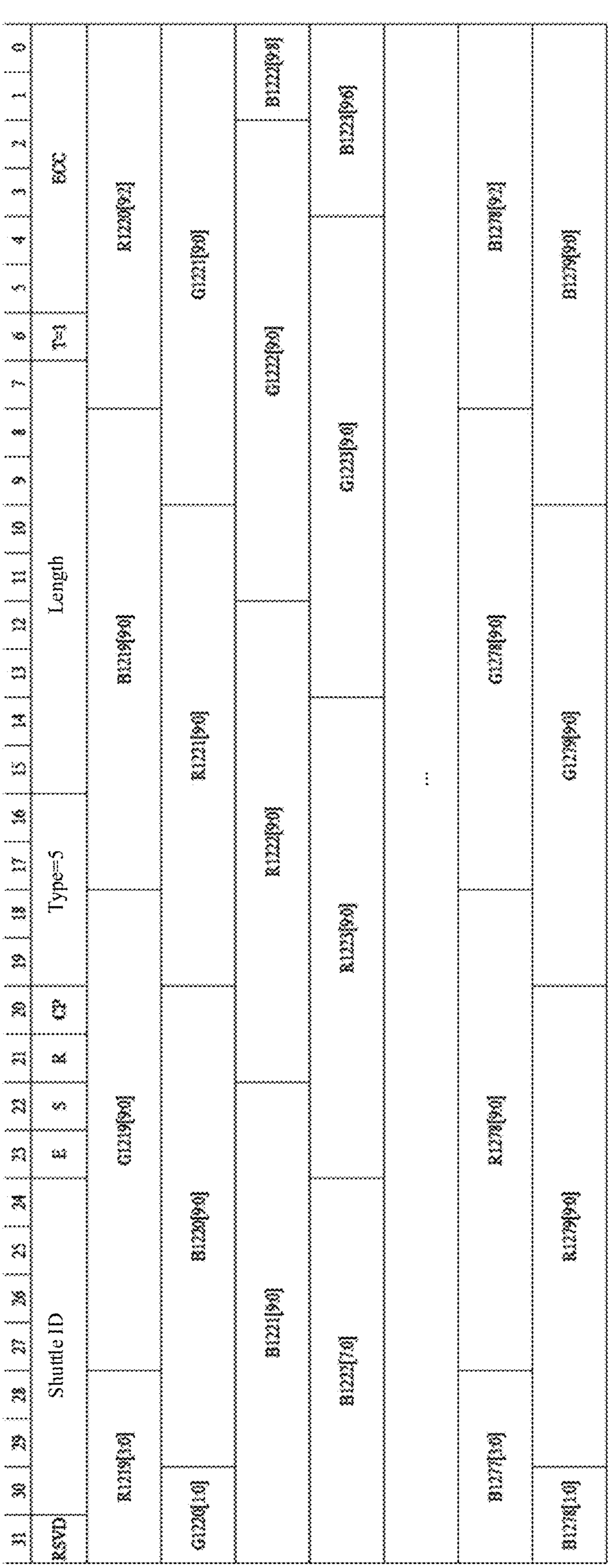

In another example, a 1280×720, P60, and 30 bpp RGB video is used as an example. A data arrangement of the video is shown in FIG. 19. A line length of an active video region is 1280 pixels. In pixel components, R[9], G[9], and B[9] are most significant bits, and R[0], G[0], and B[0] are least significant bits. FIG. 19 shows pixel components of only some pixels. Each line of the video has 1280 pixels, each pixel has 30 bits, and each line has 4800 bytes. One active video packet AVP can carry a maximum of 508 bytes of active video pixel data, and 10 active video packets AVPs are required to transmit 1280 pixels (4800 bytes). A first active video packet AVP (AVP 0) is used for transmission of a pixel 0 to four least significant bits of a G component of a pixel 135; an active video packet AVP 1 is used for transmission of six most significant bits (G135[9:4]) of the G component of the pixel 135 to eight least significant bits (B270[7:0]) of a B component of a pixel 270; . . . ; and an active video packet AVP 9 is used for transmission of four most significant bits (R1219[9:6]) of an R component of a pixel 1219 to a pixel 1279, where there are 228 bytes in total. Refer to a diagram of active video packets AVPs shown in FIG. 20A to FIG. 20C. An S flag in a packet header of the active video packet AVP 0 needs to be set to 1, to indicate that the active video packet AVP is a $1^{st}$ active video packet AVP in this line; an E flag in the active video packet AVP needs to be set to 1, to indicate that the active video packet AVP is a last active video packet AVP in this line; and an S flag and an E flag in a packet header of an intermediate active video packet AVP (for example, the active video packet AVP 1) need to be set to 0, to indicate that the active video packet is an intermediate active video packet AVP.

(4) Descriptive information packet DIP: The descriptive information packet DIP may be used to transmit audio and video configuration information, audio and video control information, and the like. The descriptive information packet may be classified into an audio control DIP packet, a compressed parameter DIP packet, a video stream information DIP packet, a video metadata DIP packet, a vendor extension DIP packet, and the like based on a type of to-be-transmitted data. If only the descriptive information packet and the audio sampling packet are transmitted between the first device and the second device, the descriptive information packet may be sent at any moment. If other high-priority data (for example, the vertical blanking packet VBP or the horizontal blanking packet HBP) is transmitted, the descriptive information packet DIP may be sent after the high-priority data or packet is sent. FIG. 21 is a diagram of a format of a descriptive information packet according to an embodiment of this application. The packet includes a 4-byte packet header and a 40-byte message body (valid payload). Meanings of fields in the packet header of the descriptive information packet may be shown in Table 7.

TABLE 7

| Field | Length (Bits) | Description |
|---|---|---|
| ECC | 6 | Error correction code |
| T | 1 | is fixed to 1, and indicates a tunnel packet. |
| Length (Length) | 9 | is fixed to 40. |
| Type (Type) | 4 | is fixed to 4b'0011, and indicates that the packet is the descriptive information packet DIP. |
| Flags | 4 | CP: content protection flag<br>R: reserved, fixed to 0<br>S: packet start flag. When a data length of a specific type of descriptive information exceeds 32 bytes, and a plurality of DIP packets are required for carrying, an S flag in a first DIP packet is 1, and the others are 0.<br>E: packet end flag. When the data length of the specific type of descriptive information exceeds 32 bytes and the plurality of DIP packets are required for carrying, an E flag of a last DIP packet is 1, and the other bits are 0.<br>When the data length of the specific type of descriptive information only requires one DIP packet for, both the flags S and E are 1. |
| Shuttle (Shuttle) ID | 7 | identifies one data transmission path on a link (Link), and has a value ranging from 0 to 127. For the audio/video adapter, this field indicates an adapter ID set before delivery. |
| RSVD | 1 | Reserved |

The first four bytes (an HB 0 to an HB 3) of the payload part of the descriptive information packet DIP are a descriptive information header, then followed by 32-byte data, and finally followed by 4 CRC bytes. There are 40 bytes in total. Meanings of fields in the payload part of the descriptive information packet may be shown in Table 8.

TABLE 8

| Byte | Description |
|---|---|
| HB 0 | Descriptive information packet header byte 0, indicating a descriptive information type |
| HB 1 | Descriptive information packet header byte 1, indicating a specific attribute |
| HB 2 | Descriptive information packet header byte 2, indicating a specific attribute |
| HB 3 | Descriptive information packet header byte 3, indicating a specific attribute |
| DB 0 | Descriptive information packet data 0 |
| DB 1 | Descriptive information packet data 1 |
| DB 2 | Descriptive information packet data 2 |
| . . . | . . . |
| DB 30 | Descriptive information packet data 30 |
| DB 31 | Descriptive information packet data 31 |
| CRC32 | Check, CRC value of the HB 0 to the DB 31 |

The descriptive information packet header byte 0 (HB 0) indicates the descriptive information type, and a meaning of the descriptive information packet header byte 0 may be shown in Table 9. The descriptive information packet header byte 1 (HB 1) is a reserved field. The descriptive information packet header bytes 2 and 3 describe the specific attributes of various types of descriptive information.

TABLE 9

| Value | Descriptive information type | Description | Quantity of packet sending times and a packet sending location |
|---|---|---|---|
| 0x00 | Reserved | Reserved | |
| 0x01 | Audio Control | Audio control descriptive information | 1. When there is a change, the descriptive information is sent once. |

TABLE 9-continued

| Value | Descriptive information type | Description | Quantity of packet sending times and a packet sending location |
|---|---|---|---|
| | | | 2. When there is no change, the descriptive information is sent once every 1280 ASPs. 3. The descriptive information is sent in a vertical blanking interval. |
| 0x02 | PLC | Light compression configuration parameter for a video | 1. The parameter is sent once per frame. 2. The parameter is transmitted in a vertical blanking interval (one line in advance of an active region). |
| 0x03 | Video Stream Info | Video stream information | 1. The video stream information is sent once per frame. 2. The video stream information is sent in the vertical blanking interval. 3. The video stream information has a highest priority among all DIP packets. When ADCP is not enabled, the video stream information is sent as soon as possible after the VBP, or when ADCP is enabled, the video stream information is sent as soon as possible after the EDP/KDP. |
| 0x04 | Video Metadata | Video metadata | 1. The video metadata is sent on demand. 2. The video metadata is sent per frame when an HDR is enabled. 3. The video metadata is sent before VBANK. |
| 0x05 | Vendor Extended | Vendor extended | 1. The vendor extended data is sent on demand. 2. The vendor extended data is sent in a blanking interval. |
| 0x06 to 0x7F | Reserved | Reserved | |
| 0x80 + Audio INFOFRAME Type | CTA-861-G Audio INFOFRAME | See CTA-861-G for Audio INFOFRAME | 1. The CTA-861-G audio information frame is sent on demand. 2. The CTA-861-G audio information frame is sent in a blanking interval. |
| 0x80 + Non-Audio INFOFRAME Type | CTA-861-G Non-audio INFOFRAME | See CTA-861-G for INFOFRAME | 1. The CTA-861-G non-audio information frame is sent on demand. 2. The CTA-861-G non-audio information frame is sent in a blanking interval. |

Figure 22:
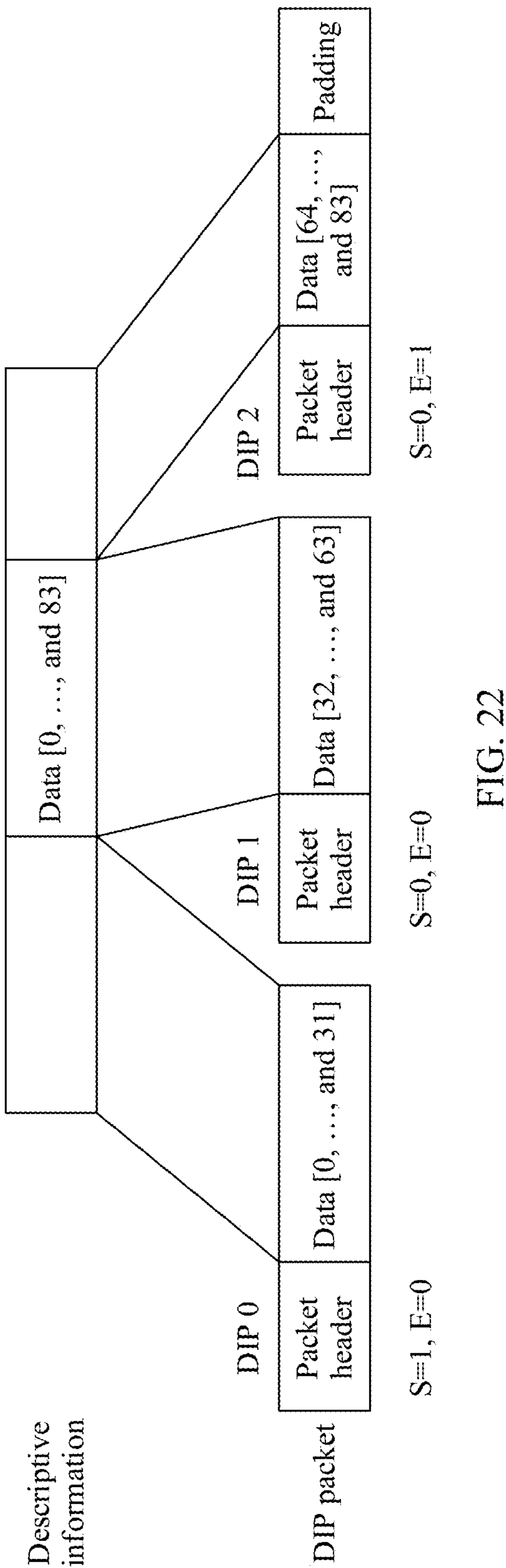
FIG. 22 is a diagram of encapsulation of a descriptive information packet according to an embodiment of this application.

FIG. 22 is a diagram of encapsulation of a descriptive information packet DIP. One descriptive information packet DTP may carry a maximum of 32 bytes of descriptive information. Usually, when a length of to-be-transmitted descriptive information exceeds 32 bytes, the descriptive information needs to be split into a plurality of descriptive information packets DTP. In this case, an S flag in a packet header of a first descriptive information packet (DIP 0) needs to be set to 1, and an E flag in a last descriptive information packet (DIP 2) needs to be set to 1, to identify the first and last descriptive information packets DTP respectively.

The audio control DTP packet may be used to transmit audio control information, and a structure of a payload part of the audio control DTP packet may be shown in Table 10. The first device (a source side) may set an audio mute flag (AudioMuteFlag) in the audio control DTP packet to Ob, to mute an audio. For example, before switching the audio (different audios) or an audio format (like a sampling frequency) and stopping playing the audio, the source side needs to set AudioMuteFlag to Ob and send the corresponding audio control DIP packet, to prevent a sink side from outputting an audio with errors such as noise and glitches that can be perceived by a user. A DB 1 to a DB 3 in a payload of the audio control packet jointly identify an audio sampling frequency, that is, AudioSampleFreq. A difference between a sampling frequency identified by AudioSampleFreq and an actual audio sampling frequency cannot exceed 0.5%. When content of the audio control packet changes, the first device (source side) should immediately send the audio control DTP packet. When the content of the audio control DTP packet remains unchanged, the first device (source side) needs to send the audio control DTP packet once every 1280 audio sampling packets. For a reserved field, the source side needs to pad 0x00; and the sink side needs to have a capability of identifying and ignoring the reserved field and reserve a parsing capability, to meet an extension requirement.

TABLE 10

| | | |
|---|---|---|
| HB 0 | Descriptive information type | Audio control descriptive information type, fixed to 0x01 |
| HB 1 | Reserved | Reserved |
| HB 2 | Version | Audio control packet version, which is fixed to 0x1 and may be extended in the future. |
| HB 3 | Length | fixed to 0x04 (DB 0 to DB 3) |
| DB 0 | AudioMuteFlag | DB 0[0]: audio mute flag<br>When the audio is muted, set the DB 0[0] to 1.<br>Otherwise, set the DB 0[0] to 0.<br>DB[7:1]: reserved |
| DB 1 | AudioSampleFreq | Audio sampling frequency, unit: 1 Hz<br>The difference between the sampling frequency identified by AudioSampleFreq and the actual audio sampling frequency cannot exceed 0.5%. |
| DB 2 | | |
| DB 3 | | |
| DB 4 to DB 31 | Reserved | Reserved field. Each byte is padded with 0x00.<br>This field can be extended in later versions of the protocol. |
| CRC32 | CRC check | CRC32 value of the HB 0 to the DB 31 |

The video stream information DTP packet may be used to transmit function information of a current video, and a structure of a payload part of the video stream information DIP packet may be shown in Table 11.

TABLE 11

| Byte | Name | Bit | Description |
|---|---|---|---|
| HB 0 | Descriptive information type | 7:0 | Descriptive information type of the video stream information, fixed to 0x03 |
| HB 1 | Reserved | 7:0 | Reserved, fixed to 0 |
| HB 2 | Version | 7:0 | Version number, fixed to 0x01 |
| HB 3 | Length | 7:0 | Active data length, fixed to 0x03 (DB 0 to DB 2) |
| DB 0 | Rsvd | 7:5 | Reserved, padded with 0 |
| | QR | 4 | Quantization range<br>0b: Limited Range. 1b: Full Range. |
| | CN3 | 3 | Video content type. Values thereof |
| | CN2 | 2 | are defined as follows: |
| | CN1 | 1 | 0x0: Unknown |
| | CN0 | 0 | 0x1: Graphics<br>0x2: Photo<br>0x3: Cinema<br>0x4: Game<br>Others: reserved |
| DB 1 | PAR3 | 7 | Image ratio mode. Values thereof |
| | PAR2 | 6 | are defined as follows: |
| | PAR1 | 5 | 0x0: Unknown |
| | PAR0 | 4 | 0x1: 4:3<br>0x2: 14:9<br>0x3: 16:9<br>Others: reserved |
| | AAR3 | 3 | Active image ratio mode. Values |
| | AAR2 | 2 | thereof are defined as follows: |
| | AAR1 | 1 | 0x0: Unknown |
| | AAR0 | 0 | 0x1: 4:3<br>0x2: 14:9<br>0x3: 16:9<br>Others: reserved |
| DB 2 | Rsvd | 7:3 | Reserved, padded with 0 |
| | QVT | 2 | Whether to enable QVT (quick video transport)<br>0: no<br>1: yes |
| | DFR | 1 | Whether to enable a DFR (dynamic refresh rate)<br>0: no<br>1: yes |

TABLE 11-continued

| Byte | Name | Bit | Description |
|---|---|---|---|
| | ALLM | 0 | Whether to enable an ALLM (auto low-latency mode)<br>0: no<br>1: yes |
| DB 3 to DB 31 | Reserved | | |
| CRC32 | Check | 31:0 | CRC32 value of the HB 0 to the DB 31 |

The video metadata DTP packet may be used to transmit video metadata information, and a structure of a payload part of the video metadata DIP packet may be shown in Table 12. When a length of the video metadata information is less than 32 bytes, one video metadata DTP can be used for carrying. In this case, both an S flag and an E flag in a packet header of the video metadata DTP need to be set to 1, and the actual metadata length is stored in the byte HB 3. When a length of the video metadata is greater than 32 bytes, the video metadata needs to be encapsulated into a plurality of video metadata DTP packets. Each packet transmits 32 bytes (the HB 3 is fixed to 32). If the last packet is less than 32 bytes, 0 is filled. In addition, the number of active bytes in the current packet is stored in the HB 3. In addition, the S flag in the first DIP packet is set to 1, and the E flag in the last DIP packet is set to 1.

TABLE 12

| Byte | Name | Bit | Description |
|---|---|---|---|
| HB 0 | Descriptive information type | 7:0 | Video metadata DIP packet, which is used to transmit the video metadata information and is fixed to 0x04. |
| HB 1 | INDEX | 3:0 | DIP INDEX, which is used to identify a current index. A sink end can check an index to determine whether a packet is lost. |
| | Reserved | 7:4 | Reserved |
| HB 2 | Organization | 7:4 | Organization to which a metadata standard belongs<br>0x0: SUCA<br>0x1: UWA<br>0x2: CTA<br>0x3: VESA<br>Others: reserved |
| | Metadata type | 3:0 | Metadata type, which is used to distinguish different metadata types of a same issuer |
| HB 3 | Length | 7:0 | Actual active data length in the packet, indicates a quantity of active bytes carried in the DIP packet when an E flag is 1. |
| DB 0 | Payload 0 | 7:0 | Payload 0, which is padded based on actual metadata information |
| DB 1 | Payload 1 | 7:0 | Payload 1, which is padded based on actual metadata information |
| DB 2 | Payload 2 | 7:0 | Payload 2, which is padded based on actual metadata information |
| . . . | . . . | 7:0 | . . . |
| DB 29 | Payload 29 | 7:0 | Payload 29, which is padded based on actual metadata information |
| DB 30 | Payload 30 | 7:0 | Payload 30, which is padded based on actual metadata information |
| DB 31 | Payload 31 | 7:0 | Payload 31, which is padded based on actual metadata information |
| CRC32 | CRC check | 7:0 | CRC32 value of the HB 0 to the DB 31 |

Content of an audio information frame of an audio information frame DTP packet needs to comply with a definition in CTA-861-G, and is carried in the audio information frame DIP packet. A packet header and a payload of the audio information frame DIP packet are separately shown in Table 13 below. When the content of the audio information frame changes, the first device (source side) needs to immediately send the audio information frame DIP packet. When the content of the audio information frame remains unchanged, the first device (source side) needs to send the audio information frame packet once every 1280 audio data DIP packets.

TABLE 13

| | | |
|---|---|---|
| HB 0 | Descriptive information type | Descriptive information type of video information<br>Source product description information frame DIP packet: fixed to 0x83<br>Audio information frame DIP packet: fixed to 0x84 MPEG source information frame DIP packet: fixed to 0x85 |
| HB 1 | Reserved | Reserved, fixed to 0 |
| HB 2 | Version | Information frame version number, corresponding to a version field of a CTA-861-G information frame |
| HB 3 | Length | Information frame length, corresponding to a length field of the CTA-861-G information frame |
| DB 0 | Information frame payload byte 1 | Refer to CTA-861-G |
| DB 1 | Information frame payload byte 2 | Refer to CTA-861-G |
| . . . | . . . | . . . |
| DB 27 | Information frame payload byte 28 | Refer to CTA-861-G |
| DB 28 to DB 31 | Reserved | Reserved field. Each byte is padded with 0x00. This field can be extended in later versions of the protocol. |
| CRC32 | Check | CRC32 value of the HB 0 to the DB 31 |

The DTP packet may further include the vendor extended DIP packet, a vendor-specific DIP packet, a video information frame DIP packet, a source product description DIP packet, a moving pictures experts group (moving pictures experts group, MPEG) source information frame DIP packet, a dynamic range DIP packet, and the like. For a specific structure, refer to the foregoing description of the DIP packet. Details are not described again.

(5) The audio sampling packet ASP, also referred to as an audio data packet, may be used to transmit an audio signal (or audio data). FIG. 24 is a diagram of a format of the audio sampling packet ASP according to an embodiment of this application.

Figure 23:
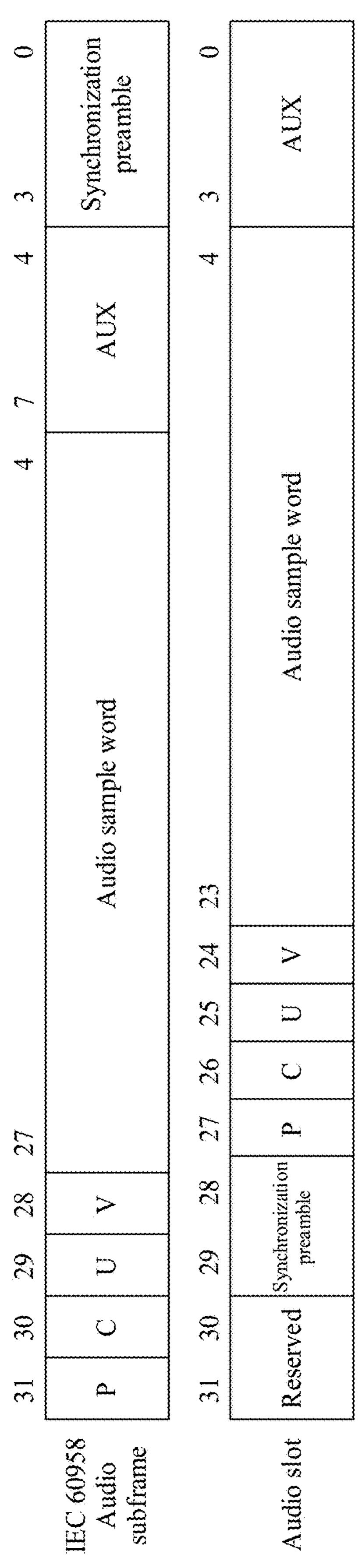
FIG. 23 is a diagram of encapsulation of an audio sampling packet according to an embodiment of this application.

The audio sampling packet ASP may be used to transmit sampling data (a pulse code modulation (linear pulse code modulation, LPCM) audio) or compressed sampling data (IEC 61937) of an audio stream. As shown in FIG. 23, UMI audio data is encapsulated in a manner similar to an audio slot of a subframe (Sub-Frame) in IEC 60958. One audio slot corresponds to four bytes. A specific meaning is shown in Table 14. As shown in FIG. 23, for an uncompressed audio, the to-be-transmitted audio needs to be encapsulated in compliance with the IEC 60958 specifications, to form an audio subframe in IEC 60958. Then the first device (for example, the audio/video adaptation module/video adaptation module in the first device) encapsulates the audio subframe into an audio slot according to the "audio sampling data structure" specification, and finally encapsulates the audio slot into an audio sampling packet ASP for transmission.

For a compressed audio, the to-be-transmitted audio needs to comply with the mapping specification (mapping rule) in chapter 6 of IEC 61937. That is, audio data is mapped to the audio subframe specified in IEC 60958. The specification for subsequent encapsulation is the same as that for the uncompressed audio.

TABLE 14

| Byte | Content | Bit | Description |
|---|---|---|---|
| Byte 0 | AUX | 3:0 | corresponds to an AUX field of data in IEC 60958. |
| | Data in IEC 60958 | 7:4 | corresponds to an audio sample word (Audio Sample Word) field of the data in IEC 60958. |
| Byte 1 | Data in IEC 60958 | 7:0 | corresponds to the audio sample word field of the data in IEC 60958. |
| Byte 2 | Data in IEC 60958 | 7:0 | corresponds to the audio sample word field of the data in IEC 60958. |
| Byte 3 | Data in IEC 60958 | 3:0 | corresponds to P, C, U, and V fields of the data in IEC 60958. |
| | Preamble (Preamble) | 5:4 | Frame header of a subframe transmitted in a current audio slot:<br>00b: B or Z: start of a block in IEC 60958<br>01b: M or X, subframe 1<br>10b: W or Y, subframe 2<br>11b: Reserved |
| | Reserved | 7:6 | Reserved |

The video adaptation module or the audio/video adaptation module encapsulates audio data that complies with the OEC 60958 or IEC 61937 protocol into an audio sampling packet ASP to transmit the audio data. A structure of the ASP packet may be shown in FIG. 24. One audio slot corresponds to four bytes, and a data length of the ASP packet is variable. In a case of 32 channels, audio data has 128 bytes, that is, a length of tunnel packet header+ASP audio packet header+ audio data is 136 bytes. Specific meanings of the bytes are shown in Table 15.

TABLE 15

| Byte | Content | Bit | Description |
|---|---|---|---|
| HB 0 | Audio coding type | 3:0 | 0x0: LPCM<br>0x1: coding in IEC 61937<br>Others: reserved |
| | Reserved | 7:4 | Reserved |
| HB 1 | Quantity of audio channels | 5:0 | 0x0: two channels<br>0x1: four channels<br>0x2: sixth channels<br>. . .<br>0xF: 32 channels<br>0x10 to 0x3F: reserved |
| | Reserved | 7:6 | Reserved |
| HB 2 | Reserved | 7:0 | Reserved |
| HB 3 | Reserved | 7:0 | Reserved |

(6) Encryption description packet (encryption description packet, EDP) and key distribution packet (key distribution packet, KDP): For structures of the encryption description packet EDP and the key distribution packet KDP, refer to the foregoing descriptions of the video packet. Details are not described again. For the encryption description packet EDP, an encryption parameter such as an encryption algorithm may be carried in a valid payload of the encryption description packet EDP; and for the key distribution packet KDP, an encryption key may be carried in a valid payload of the encryption description packet KDP.

In some implementations, because the vertical blanking packet VBP in the video packet is used to transmit the vertical synchronization signal, to indicate the start of one frame of video image, the encryption description packet EDP and the key distribution packet KDP are used to decrypt the active video data and the like, if these packets are transmitted incorrectly, the second device on the receive side may not correctly output the video signal. To ensure transmission of these packets, the first device may consecutively and repeatedly send a plurality of vertical blanking packets VBPs and encryption description packets EDPs, and the key distribution packet is sent once per frame, but a plurality of frames need to be sent consecutively. For example, if three encryption description packets EDPs are sent consecutively, after receiving the foregoing three types of packets, the second device first performs correctness check, for example, CRC check. If the check fails, the second device receives a next packet until a correct packet is received. For example, after receiving the encryption description packet EDP, the video receiving adapter in the second device first performs CRC check. If the check fails, the video receiving adapter receives a next encryption description packet EDP until a correct encryption description packet EDP is received.

Figure 25:
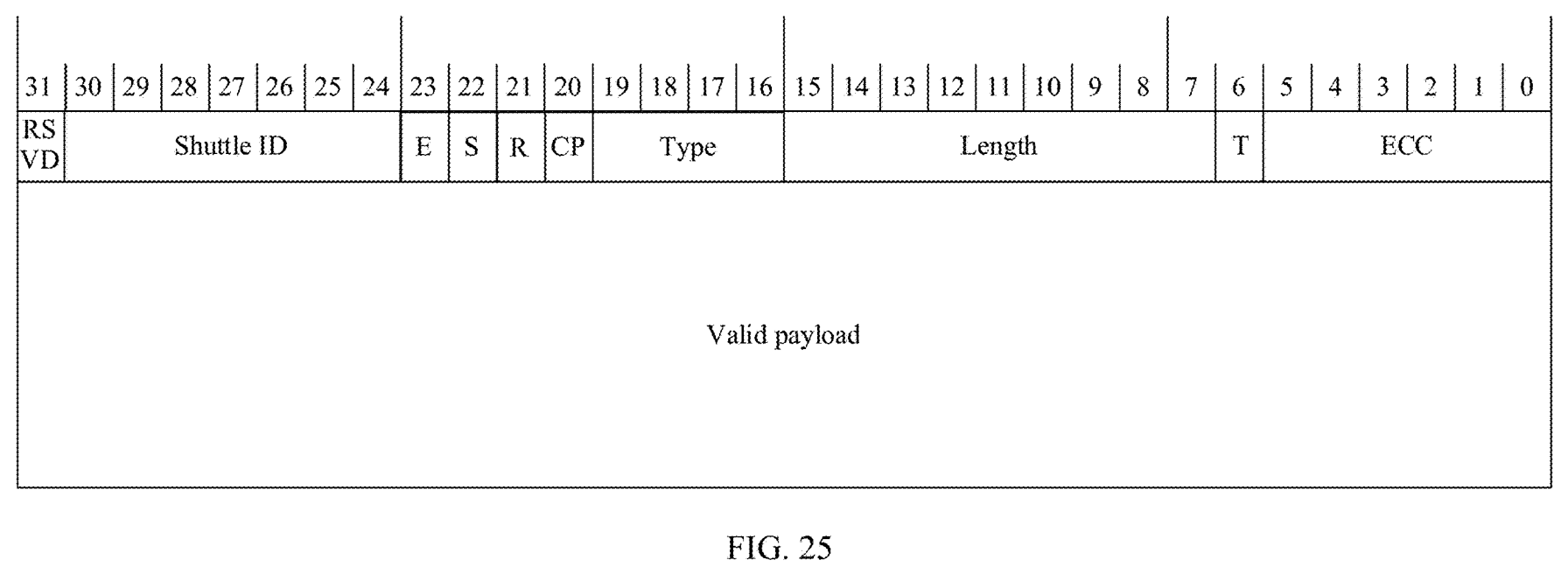

In some other implementations, a packet structure is shown in FIG. 25. Alternatively, R flags in the packet headers of the vertical blanking packet VBP, the encryption description packet EDP, and the key distribution packet KDP may be changed from reserved (Reserved) to retry (Retry), and the transport layer implements reliable transmission. A reliable transmission rule of the transport layer is as follows: When the R flag in the packet header is 0, the receive side (for example, the second device) transmits a packet backward regardless of whether the received packet is correct. When the R flag is 1, whether the packet is correct needs to be checked. If the packet is incorrect, a retransmission request is initiated to request a previous level to retransmit the packet. In other words, the first device may enable each of the packet headers of the vertical blanking packet VBP, the encryption description packet EDP, and the key distribution packet KDP to include a retry flag, and when the retry flag is 1, it indicates the receive end to check whether the packet is correct and initiate the retransmission request when the packet is incorrect. The second device initiates packet retransmission when any one of the vertical blanking packet VBP, the encryption description packet EDP, and the key distribution packet KDP is incorrect.

Return to FIG. 6. S605: The second device generates the vertical synchronization signal based on the vertical blanking packet, and generates the horizontal synchronization signal based on the horizontal blanking packet.

S606: The second device generates the video data signal and the display enable signal based on the vertical synchronization signal, the horizontal synchronization signal, the pixel clock signal, and the active video data carried in the active video packet.

S607: The second device outputs the video signal, where the video signal includes the vertical synchronization signal, the horizontal synchronization signal, the pixel clock signal, the display enable signal, and the video data signal.

In this embodiment of this application, the second device (or the video receiving adapter in the second device) may demultiplex the video stream from the first device (for example, demultiplex the video stream using a stream demultiplexer), to obtain the packets such as the vertical blanking packet or the horizontal blanking packet sent by the first device. It should be understood that, in this embodiment of this application, that the video stream is demultiplexed, to obtain a plurality of types of packets may mean that the plurality of types of packets in the video stream are identified (or classified) based on identifiers of the packets. For example, the video stream includes the vertical blanking packet, the horizontal blanking packet, and the active video packet. That the video stream is demultiplexed, to obtain the vertical blanking packet, the horizontal blanking packet, and the active video packet may mean that the vertical blanking packet, the horizontal blanking packet, and the active video packet in the video stream are identified (or classified) based on an identifier of the vertical blanking packet (for example, 4b'0001), an identifier of the horizontal blanking packet (for example, 4b'0010), and an identifier of the active video packet (for example, 4b'0101).

Figure 26:
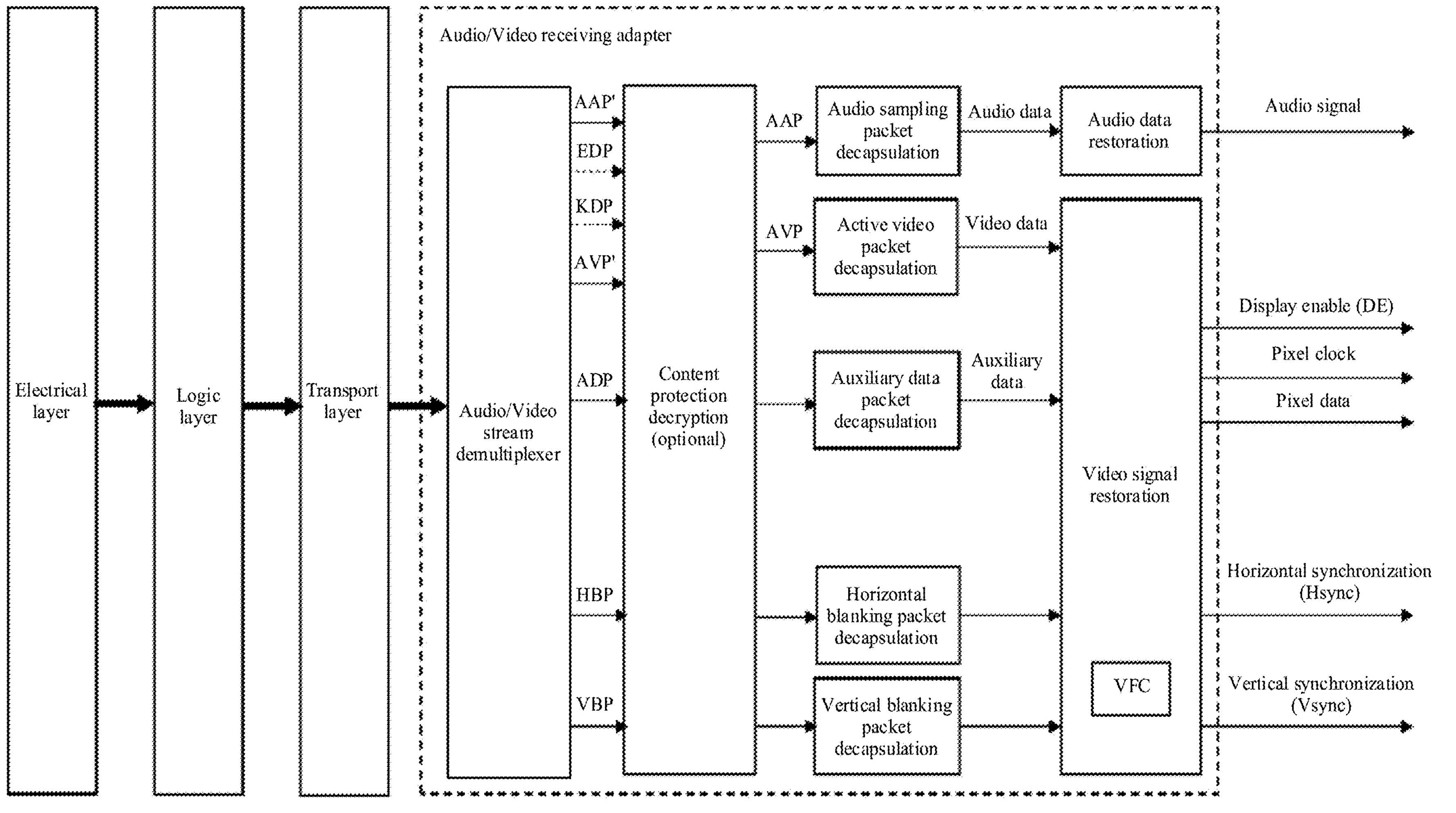
FIG. 26 is a logical diagram 1 of a video receiving adapter according to an embodiment of this application.

The video signal timing parameters such as the quantity of VSync lines (VSyncLines), the quantity of HSync pixels (HSyncPixels), and the pixel clock signal frequency (PixelClockFreq) shown in Table 1 may be pre-agreed on or pre-negotiated between the second device and the first device, or may be obtained based on the VFC in the vertical blanking packet VBP sent by the first device. This is not limited in embodiments of this application. Refer to a logical diagram of the video receiving adapter shown in FIG. 26. When receiving the vertical blanking packet VBP from the first device, the second device (or the video (or audio/video) receiving adapter in the second device) determines to change the vertical synchronization signal from the low level to the high level, changes (or pulls up) the vertical synchronization polarity (VSyncPol) from the low level to the high level, and keeps the quantity of VSync lines, to generate the vertical synchronization signal. Similarly, when receiving the horizontal blanking packet HBP from the first device, the second device counts HActivePixels+HfrontPorch, then changes (or pulls up) the horizontal synchronization polarity (HSyncPol) from the low level to the high level, and keeps the quantity of HSync pixels, to generate the horizontal synchronization signal.

Each transmission path of the video data signal (or the pixel data signal) transmits, in each pixel clock cycle, data corresponding to one pixel. With reference to the example of the video signal timing parameters shown in FIG. 7, it can be seen that no active pixel is transmitted in the video data signal (or the pixel data signal) in the vertical blanking interval and the horizontal blanking interval. When the display enable signal is at the high level, it indicates that the active video pixel data is transmitted in the current pixel data. The second device may configure a local phase-locked loop (phase locked loop, PLL) based on the pixel clock signal frequency (PixelClockFreq), to generate a local pixel clock signal. After receiving the active video packet AVP, the second device may place the active video data carried in the active video packet AVP (that is, the video pixel data carried in the active video packet AVP) into a buffer of a “video signal restoration” module. The “video signal restoration” module pulls up the display enable signal based on the timing parameters after HBackPorch (HBlankPixels-HSyncPixels-HFrontPorch) pixel clocks starting from a falling edge of the horizontal synchronization signal or after HSync+HBackPorch (HBlankPixels-HFrontPorch) pixel clocks starting from the rising edge of the horizontal synchronization signal, and outputs, along the pixel clock through the video signal line, the pixel data buffered in the buffer.

In some implementations, the video stream may further include the descriptive information packet DIP. The descriptive information packet DIP may be used to transmit the descriptive information such as the audio and video configuration information and the audio and video control information. The second device may further perform audio and video configuration and control based on the descriptive information such as the audio and video configuration information and the audio and video control information, and may further output an audio signal based on the audio signal (or audio data) in the transmitted audio sampling packet ASP.

In some implementations, refer to the logical diagram of the video sending adapter shown in FIG. 8. If the first device enables content protection (for example, encryption), and encrypts the active video packet AVP and the audio data ASP (for example, performs ADCP encryption), before processing the active video packet AVP and the audio data ASP, the second device may further obtain an encryption parameter carried in the encryption description packet EDP and an encryption key carried in the key distribution packet KDP in the video stream, and decrypt the encrypted active video packet AVP' and the encrypted audio data ASP', to obtain a decrypted active video packet AVP and a decrypted audio sampling packet ASP.

It should be understood that, if the encryption parameter or the encryption key is agreed on or pre-negotiated between the first device and the second device, the video stream may alternatively not include the encryption description packet EDP and the key distribution packet KDP.

In some embodiments, as shown in the logical diagram of the video sending adapter shown in FIG. 8, the first device may generate the vertical blanking packet VBP, the horizontal blanking packet HBP, the active video packet AVP, the audio sampling packet ASP, and the descriptive information packet DIP, and encrypt the active video packet AVP and the audio sampling packet ASP. The second device may decrypt the active video packet AVP and the audio sampling packet ASP, and parse the decrypted active video packet AVP and audio sampling packet ASP based on the vertical blanking packet VBP, the horizontal blanking packet HBP, and the descriptive information packet DIP, to obtain the video data and the audio data.

In addition, the first device may also encrypt one or more of the vertical blanking packet VBP, the horizontal blanking packet HBP, the active video packet AVP, the audio sampling packet ASP, and the descriptive information DIP according to a requirement. The first device may set the content protection flag (for example, the CP flag) in the packet header to 1 or 0 based on the content protection (for example, encryption) requirement, and the first device (for example, the content protection module in the first device) may perform processing based on the CP flag in the packet header. If the CP flag is 1, the packet is to be encrypted; or if the CP flag is 0, the packet is not to be encrypted. The second device may determine whether content protection flags (for example, CP flags) in the vertical blanking packet VBP, the horizontal blanking packet HBP, the active video packet AVP, the audio sampling packet ASP, and the descriptive information DIP are 1, and decrypt the packets when the content protection flags are 1.

Figure 27:
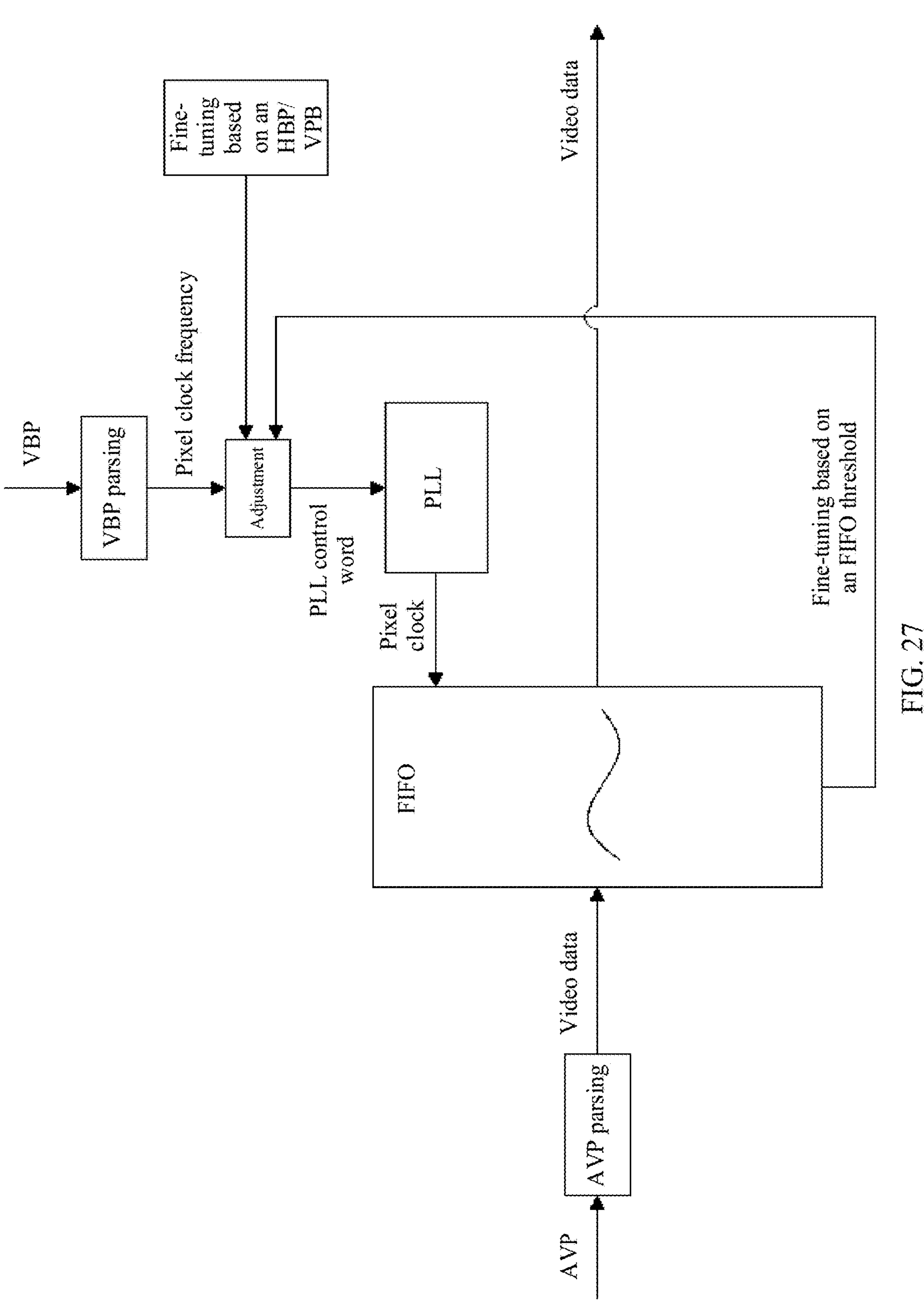
FIG. 27 is a diagram of clock recovery according to an embodiment of this application.

The audio/video receiving adapter (or the video receiving adapter) and the audio/video sending adapter (or the video receiving adapter) are located in different devices. To avoid a deviation between a pixel clock of the audio/video receiving adapter and a pixel clock of the video sending adapter caused by a clock drift, spectrum spreading, burst, and the like, this embodiment of this application provides a method for pixel clock synchronization processing by using a first in first out (first in first out, FIFO) threshold solution. FIG. 27 shows pixel clock recovery of the video receiving adapter. When a video information stream is received, a key information pixel clock frequency (PixelClockFreq) for recovering a video stream is parsed from the vertical blanking packet VBP. Asynchronous FIFO is used to synchronize a bandwidth from a receiver to a transmitter, a video clock is reconstructed based on PixelClockFreq, video timing is constructed based on other timing information, and the pixel clock frequency is fine-tuned based on a packet location of the HBP/VBP.

In some embodiments, when the video receiving adapter reconstructs a video pixel data stream, the audio/video receiving adapter needs to buffer a specific amount of audio/video data, to avoid video data output interruption caused by a delay in arrival of some packets due to jitter in a video data packet transmission process. To ensure that a specific amount of video data can be accumulated in the buffer to resist transmission jitter, the video receiving adapter cannot immediately output a $1^{st}$ active video packet via a video data signal after receiving the 1st active video packet AVP in each line (an S flag in the packet is 1), and sends the buffered active video data after an accumulation period (for example, the video is delayed by t pixel clocks (tVideoDelay)). An active video packet AVP other than the $1^{st}$ active video packet AVP can be directly output after being received.

The accumulation period needs to ensure that the buffered video data can basically resist impact of transmission jitter on the active video packet AVP, to prevent the video receiving adapter from frequently inserting padding data into an active video region due to buffer underflow. The accumulation period should not be excessively long, to avoid an excessive delay and an increase in buffer costs. The accumulation period is affected by jitter of the transport layer, the logical layer, and a routing device.

Figure 28:
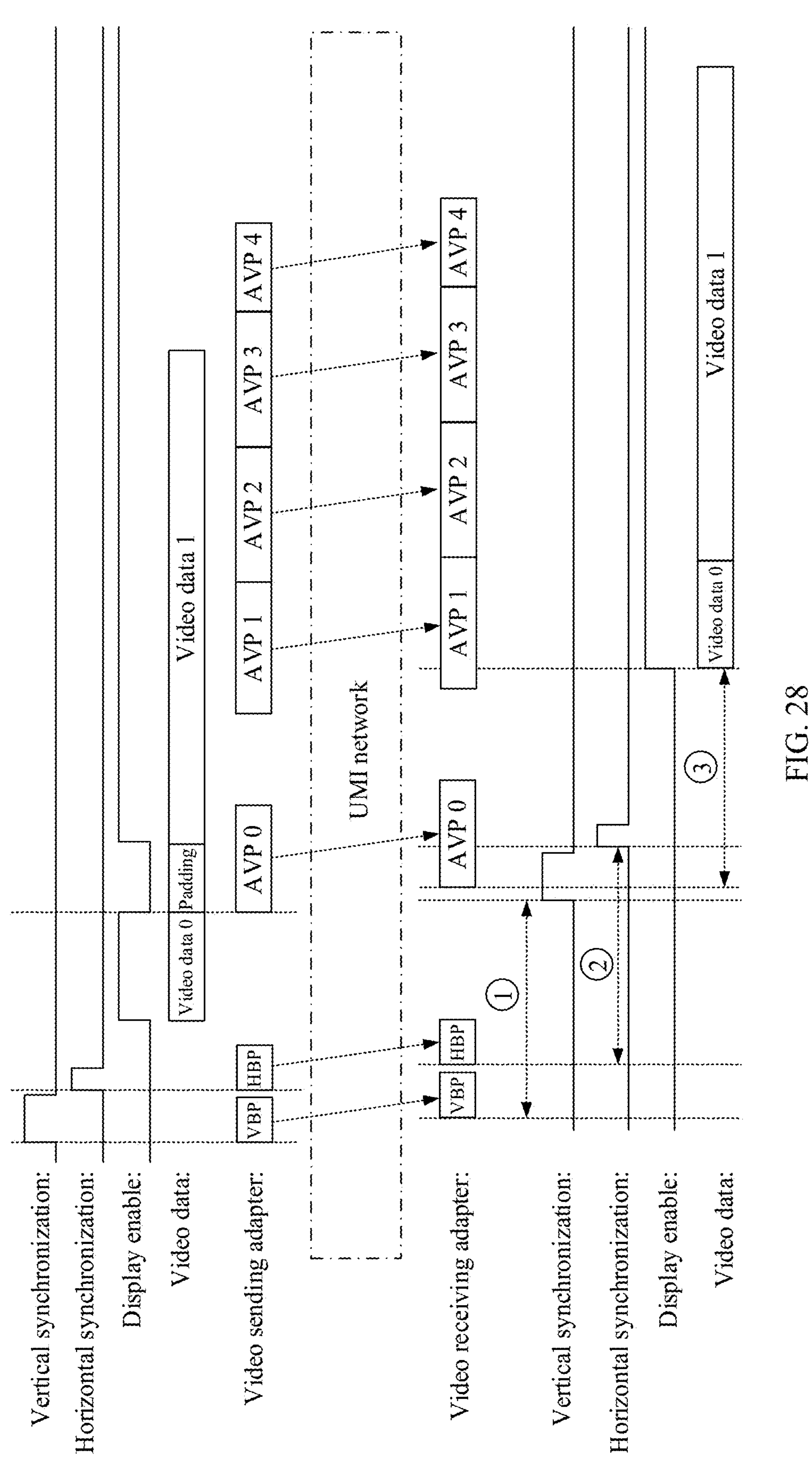
FIG. 28 is a diagram of video signal transmission and recovery according to an embodiment of this application.

In addition, refer to a diagram of video signal transmission and recovery shown in FIG. 28. Vertical synchronization indicates the vertical synchronization signal (VSYNC), horizontal synchronization indicates the horizontal synchronization signal (HSYNC), display enable indicates the display enable signal, and video data indicates the video data signal. ① may indicate that the vertical synchronization signal is delayed by t pixel clocks starting from the back porch of the vertical blanking interval (tVideoDelay-VSYNC-VBackporch). ② may indicate that the horizontal synchronization signal is delayed by t pixel clocks starting from the back porch of the horizontal blanking interval (tVideoDelay-HSYNC-HBackporch). ③ may indicate that the video data is delayed by t pixel clocks (tVideoDelay). To ensure that a specific amount of video data can be accumulated in the buffer, after receiving the vertical blanking packet VBP and the horizontal blanking packet HBP, the video receiving adapter also needs to generate the vertical synchronization signal (VSYNC) and the horizontal synchronization signal (HSYNC) after a delay of the accumulation period, that is, a delay of the t pixel clocks (tVideoDelay). For example, after receiving the vertical blanking packet VBP, the second device on the receive side generates the vertical synchronization signal after a delay of a fixed time (for example, tVideoDelay), keeps the vertical synchronization signal for VSyncLines*HTotal pixel clocks; and after receiving the horizontal synchronization signal HBP packet, the second device on the receive side generates the horizontal synchronization signal after a delay of a fixed time (for example, tVideoDelay), and keeps the horizontal synchronization signal for HSyncPixels pixel cycles. After receiving the active video packet AVP, the second device on the receive side places the video pixel data carried in the active video packet into the buffer of the "video signal restoration" module, and outputs the video pixel data along with the display enable signal.

It should be understood that, after receiving a corresponding packet header (for example, the packet header of the vertical blanking packet VBP) and identifying a packet type based on the packet header, the video receiving adapter can start tVideoDelay timing, without waiting for the end of receiving a complete packet. For a system that uses frame forwarding, that is, a system in which a transport layer needs to receive a complete frame before copying data of the entire frame from a buffer of the transport layer to a buffer of an adapter, tVideoDelay timing is started only after a complete packet is received. In this case, a quantity of pixel clock cycles corresponding to the packet needs to be subtracted. 8 bpc in RGB/YUV444 is used as an example. Nine pixel clock cycles need to be subtracted for the vertical blanking packet VBP, eight pixel clock cycles need to be subtracted for the horizontal blanking packet HBP, and a quantity of pixel clock cycles to be subtracted needs to be calculated based on an actual length of the valid payload part for the active video packet AVP.

Figure 29:
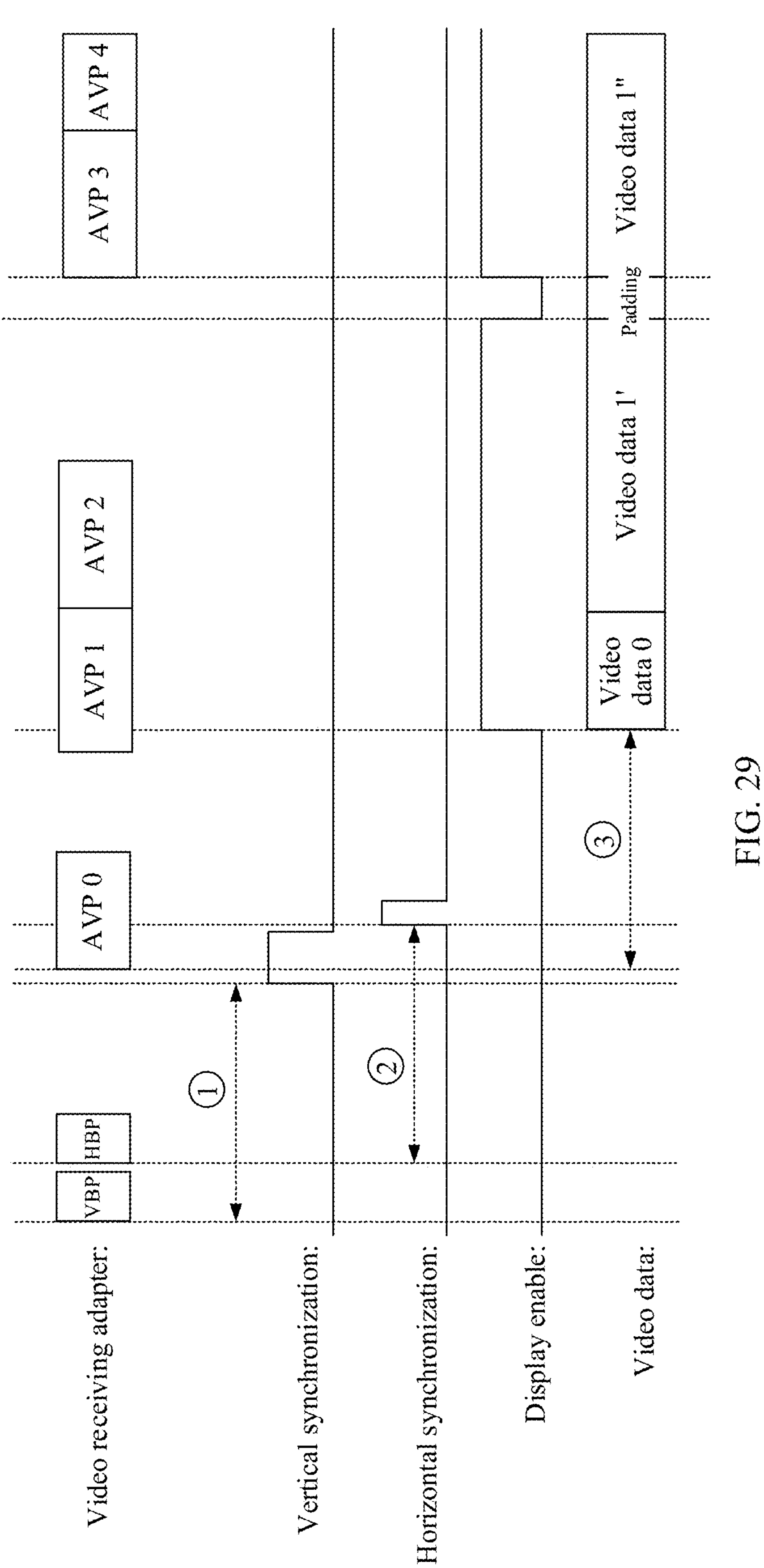
FIG. 29 is a diagram of video data filling according to an embodiment of this application.

In some embodiments, when buffer underflow of the video receiving adapter occurs, the problem may be resolved in a padding manner. To be specific, the display enable (DE) signal is temporarily pulled down, the display enable signal is pulled up when there is data in the buffer, and the video data continues to be sent. As shown in FIG. 29, arrival of an active video packet AVP 3 is delayed, and buffer underflow of the video receiving adapter occurs. After buffered pixels are sent, the display enable signal needs to be temporarily pulled down. After the active video packet AVP 3 is received, video data sending is resumed immediately.

It may be understood that, to implement the functions in the foregoing embodiments, the first device and the second device include corresponding hardware structures and/or software modules for performing the functions. A person of ordinary skill in the art should easily be aware that, in combination with the example units, method, and steps described in embodiments disclosed in this application, this application can be implemented by hardware or a combination of hardware and computer software. Whether a function is performed by hardware or hardware driven by computer software depends on particular application scenarios and design constraint conditions of the technical solutions.

Figure 30:
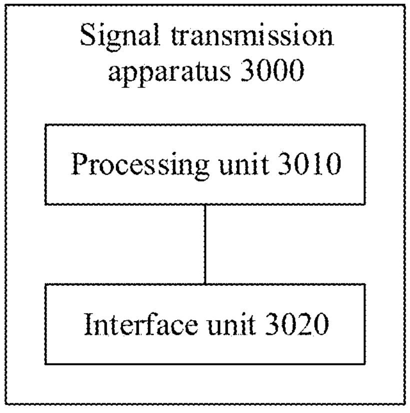
FIG. 30 is a diagram 1 of a structure of a communication apparatus according to an embodiment of this application.
Figure 31:
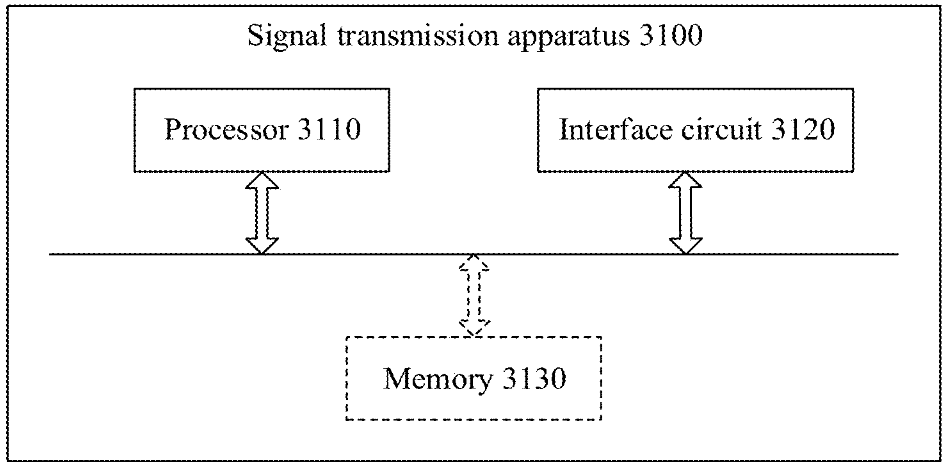
FIG. 31 is a diagram 2 of a structure of a communication apparatus according to an embodiment of this application.

FIG. 30 and FIG. 31 are diagrams of structures of possible signal transmission apparatuses according to an embodiment of this application. These signal transmission apparatuses may be configured to implement functions of the first device or the second device in the foregoing method embodiments, and therefore can also achieve beneficial effect of the foregoing method embodiments. In a possible implementation, the signal transmission apparatus may be the first device or the second device, or may be a module (for example, a chip) used in the first device or the second device.

As shown in FIG. 30, a signal transmission apparatus 3000 includes a processing unit 3010 and an interface unit 3020, where the interface unit 3020 may further be a transceiver unit or an input/output interface. The signal transmission apparatus 3000 may be configured to implement functions of the first device or the second device in the method embodiment shown in FIG. 6.

When the signal transmission apparatus 3000 is configured to implement the functions of the first device in the method embodiment shown in FIG. 6, the processing unit 3010 is configured to: obtain a video signal, where the video signal includes a vertical synchronization signal, a horizontal synchronization signal, a pixel clock signal, a display enable signal, and a video data signal; obtain active video data in the video data signal based on the pixel clock signal and the display enable signal; and encapsulate a vertical blanking packet based on the vertical synchronization signal, encapsulate a horizontal blanking packet based on the horizontal synchronization signal, and encapsulate an active video packet based on the active video data; and the interface unit 3020 is configured to multiplex the vertical blanking packet, the horizontal blanking packet, and the active video packet into a video stream for sending.

In a possible design, the processing unit 3010 is further configured to: obtain descriptive information in a blanking interval in the video data signal based on the pixel clock signal and the display enable signal; and encapsulate a descriptive information packet based on the descriptive information. When multiplexing the vertical blanking packet, the horizontal blanking packet, and the active video packet into the video stream for sending, the interface unit 3020 is specifically configured to multiplex the vertical blanking packet, the horizontal blanking packet, the active video packet, and the descriptive information packet into the video stream for sending.

In a possible design, when encapsulating the descriptive information packet based on the descriptive information, the processing unit 3010 is specifically configured to: when the video signal further includes a channel-associated audio signal, encapsulate the descriptive information packet based on the descriptive information and the audio signal.

In a possible design, the processing unit 3010 is further configured to: when the video signal further includes a channel-associated audio signal, encapsulate an audio sampling packet based on the audio signal. When multiplexing the vertical blanking packet, the horizontal blanking packet, the active video packet, and the descriptive information packet into the video stream for sending, the interface unit 3020 is specifically configured to multiplex the vertical blanking packet, the horizontal blanking packet, the active video packet, the descriptive information packet, and the audio sampling packet into the video stream for sending.

In a possible design, the processing unit 3010 is further configured to: encrypt the active video packet based on an encryption parameter and an encryption key, to obtain an encrypted active video packet; and encapsulate an encryption description packet based on the encryption parameter, and encapsulate a key distribution packet based on the encryption key. When multiplexing the vertical blanking packet, the horizontal blanking packet, the active video packet, and the descriptive information packet into the video stream for sending, the interface unit 3020 is specifically configured to multiplex the vertical blanking packet, the horizontal blanking packet, the encrypted active video packet, the descriptive information packet, the encryption description packet, and the key distribution packet into the video stream for sending.

In a possible design, the processing unit 3010 is further configured to: encrypt the active video packet and the audio sampling packet based on an encryption parameter and an encryption key, to obtain an encrypted active video packet and an encrypted audio sampling packet; and encapsulate an encryption description packet based on the encryption parameter, and encapsulate a key distribution packet based on the encryption key. When multiplexing the vertical blanking packet, the horizontal blanking packet, the active video packet, the descriptive information packet, and the audio sampling packet into the video stream for sending, the interface unit 3020 is specifically configured to: multiplex the vertical blanking packet, the horizontal blanking packet, the encrypted active video packet, the descriptive information packet, the encrypted audio sampling packet, the encryption description packet, and the key distribution packet into the video stream, and send the video stream.

In a possible design, a plurality of vertical blanking packets, encryption description packets, and key distribution packets are consecutively and repeatedly sent in the video stream.

In a possible design, packet headers of the vertical blanking packet, the encryption description packet, and the key distribution packet each include a retry Retry flag, and when the retry flag is 1, it indicates a receive end to check whether the packet is correct and initiate a retransmission request when the packet is incorrect.

In a possible design, when encapsulating the vertical blanking packet based on the vertical synchronization signal, the processing unit 3010 is specifically configured to encapsulate the vertical blanking packet based on the vertical synchronization signal and video frame control information, where the video frame control information includes a pixel clock parameter of the pixel clock signal.

In a possible design, when encapsulating the horizontal blanking packet based on the horizontal synchronization signal, the processing unit 3010 is specifically configured to encapsulate the horizontal blanking packet based on the horizontal synchronization signal and a pixel clock count value of the pixel clock signal.

When the signal transmission apparatus 3000 is configured to implement the functions of the second device in the method embodiment shown in FIG. 6, the interface unit 3020 is configured to receive a video stream, where the video stream includes a vertical blanking packet, a horizontal blanking packet, and an active video packet; and the processing unit 3010 is configured to: generate a vertical synchronization signal based on the vertical blanking packet, and generate a horizontal synchronization signal based on the horizontal blanking packet; generate a video data signal and a display enable signal based on the vertical synchronization signal, the horizontal synchronization signal, a pixel clock signal, and active video data carried in the active video packet; and output a video signal, where the video signal includes the vertical synchronization signal, the horizontal synchronization signal, the pixel clock signal, the display enable signal, and the video data signal.

In a possible design, the video stream further includes a descriptive information packet, and when generating the video data signal and the display enable signal based on the vertical synchronization signal, the horizontal synchronization signal, the pixel clock signal, and the active video data carried in the active video packet, the processing unit 3010 is specifically configured to generate the video data signal and the display enable signal based on the vertical synchronization signal, the horizontal synchronization signal, the pixel clock signal, the active video data carried in the active video packet, and descriptive information carried in the descriptive information packet.

In a possible design, the processing unit 3010 is further configured to generate an audio signal based on the descriptive information packet, where the output video signal further includes the audio signal.

In a possible design, the video stream further includes an audio sampling packet, and the processing unit 3010 is further configured to generate an audio signal based on the audio sampling packet, where the output video signal further includes the audio signal.

In a possible design, the video stream further includes an encryption description packet and a key distribution packet, and the active video packet is an encrypted active video packet. The processing unit 3010 is further configured to: obtain an encryption parameter carried in the encryption description packet, and obtain an encryption key carried in the key distribution packet; and decrypt the encrypted active video packet based on the encryption parameter and the encryption key, to obtain a decrypted active video packet.

In a possible design, the video stream further includes an encryption description packet and a key distribution packet, and the active video packet and the audio sampling packet are an encrypted active video packet and an encrypted audio sampling packet. The processing unit 3010 is further configured to: obtain an encryption parameter carried in the encryption description packet, and obtain an encryption key carried in the key distribution packet; and decrypt the encrypted active video packet and the encrypted audio sampling packet based on the encryption parameter and the encryption key, to obtain a decrypted active video packet and a decrypted audio sampling packet.

In a possible design, the video stream includes a plurality of vertical blanking packets, encryption description packets, and key distribution packets that are consecutively and repeatedly sent. The interface unit 3020 is further configured to select, from the plurality of vertical blanking packets, encryption description packets, and key distribution packets that are consecutively and repeatedly sent, a vertical blanking packet, an encryption description packet, and a key distribution packet that pass correctness check.

In a possible design, packet headers of the vertical blanking packet, the encryption description packet, and the key distribution packet each include a retry Retry flag, and when the retry flag is 1, it indicates a receive end to check whether the packet is correct and initiate a retransmission request when the packet is incorrect. The interface unit 3020 is further configured to initiate retransmission of the packet when any one of the vertical blanking packet, the encryption description packet, and the key distribution packet is incorrect.

In a possible design, the processing unit 3010 is further configured to: obtain video frame control information carried in the vertical blanking packet, where the video frame control information includes a pixel clock parameter; and generate the pixel clock signal based on the video frame control information.

In a possible design, the horizontal blanking packet further carries a pixel clock count value of the pixel clock signal, and the processing unit 3010 is further configured to correct the pixel clock signal based on the pixel clock count value.

As shown in FIG. 31, this application further provides a signal transmission apparatus 3100, including a processor 3110 and an interface circuit 3120. The processor 3110 and the interface circuit 3120 are coupled to each other. It may be understood that the interface circuit 3120 may be a transceiver, an input/output interface, an input interface, an output interface, a communication interface, or the like. Optionally, the signal transmission apparatus 3100 may further include a memory 3130, configured to: store instructions executed by the processor 3110, store input data required by the processor 3110 to run the instructions, or store data generated after the processor 3110 runs the instructions. Optionally, the memory 3130 may alternatively be integrated with the processor 3110.

When the signal transmission apparatus 3100 is configured to implement the method shown in FIG. 6, the processor 3110 may be configured to implement functions of the processing unit 3010, and the interface circuit 3120 may be configured to implement functions of the interface unit 3020.

It should be noted that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a logical circuit, a field programmable gate array (field programmable gate array, FPGA), another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk drive, a removable hard disk drive, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in a network device or a terminal device. Certainly, the processor and the storage medium may alternatively exist as discrete components in a network device or a terminal device.

All or some of the foregoing embodiments may be implemented by software, hardware, firmware, or any combination thereof. When the software is used for implementation, all or some of the foregoing embodiments may be implemented in a form of a computer program product. The computer program product includes one or more computer programs or instructions. When the computer programs or instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or instructions may be stored in a computer-readable storage medium, or transmitted from one computer-readable storage medium to another computer-readable storage medium. For example, the computer programs or instructions may be transmitted from one network device, terminal, computer, server, or data center to another network device, terminal, computer, server, or data center in a wired or wireless manner. The computer-readable storage medium may be any usable medium that can be accessed by the computer, or a data storage device, for example, a server or a data center, integrating one or more usable media. The usable medium may be a magnetic medium, for example, a floppy disk, a hard disk drive, or a magnetic tape, may be an optical medium, for example, a digital video disc, or may be a semiconductor medium, for example, a solid-state drive. The computer-readable storage medium may be a volatile or non-volatile storage medium, or may include two types of storage media: a volatile storage medium and a non-volatile storage medium.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In addition, it should be understood that the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

It may be understood that various numbers in embodiments of this application are merely used for differentiation for ease of description, and are not used to limit the scope of embodiments of this application. Sequence numbers of the foregoing processes do not mean an execution sequence, and the execution sequence of the processes should be determined based on functions and internal logic of the processes.

The invention claimed is:

1. A signal transmission method, comprising:

obtaining a video signal, wherein the video signal comprises a vertical synchronization signal, a horizontal synchronization signal, a pixel clock signal, a display enable signal, and a video data signal;

obtaining active video data in the video data signal based on the pixel clock signal and the display enable signal;

encapsulating a vertical blanking packet based on the vertical synchronization signal;

encapsulating a horizontal blanking packet based on the horizontal synchronization signal;

encapsulating an active video packet based on the active video data;

multiplexing the vertical blanking packet, the horizontal blanking packet, and the active video packet into a video stream for sending;

obtaining, based on the pixel clock signal and the display enable signal, descriptive information in a blanking interval in the video data signal; and encapsulating a descriptive information packet based on the descriptive information; and wherein multiplexing the vertical blanking packet, the horizontal blanking packet, and the active video packet into the video stream for sending comprises:

multiplexing the vertical blanking packet, the horizontal blanking packet, the active video packet, and the descriptive information packet into the video stream for sending.

2. The method according to claim 1, wherein the method further comprises:

when the video signal further comprises a channel-associated audio signal, encapsulating an audio sampling packet based on the audio signal; and wherein multiplexing the vertical blanking packet, the horizontal blanking packet, the active video packet, and the descriptive information packet into the video stream for sending comprises:

multiplexing the vertical blanking packet, the horizontal blanking packet, the active video packet, the descriptive information packet, and the audio sampling packet into the video stream for sending.

3. The method according to claim 2, wherein the method further comprises:

encrypting the active video packet and the audio sampling packet based on an encryption parameter and an encryption key to obtain an encrypted active video packet and an encrypted audio sampling packet; and encapsulating an encryption description packet based on the encryption parameter, and encapsulating a key distribution packet based on the encryption key; and wherein multiplexing the vertical blanking packet, the horizontal blanking packet, the active video packet, the descriptive information packet, and the audio sampling packet into the video stream for sending comprises:

multiplexing the vertical blanking packet, the horizontal blanking packet, the encrypted active video packet, the descriptive information packet, the encrypted audio sampling packet, the encryption description packet, and the key distribution packet into the video stream for sending.

4. The method according to claim 1, wherein encapsulating the vertical blanking packet based on the vertical synchronization signal comprises:

encapsulating the vertical blanking packet based on the vertical synchronization signal and video frame control information, wherein the video frame control information comprises a pixel clock parameter of the pixel clock signal.

5. The method according to claim 1, wherein multiplexing the vertical blanking packet, the horizontal blanking packet, and the active video packet into the video stream comprises:

multiplexing the vertical blanking packet, the horizontal blanking packet, and the active video packet into the video stream using a stream multiplexer.

6. An apparatus, which is a slave clock apparatus or included in the slave clock apparatus, wherein the apparatus comprises:

at least one processor; and at least one memory coupled to the at least one processor and storing programming instructions for execution by the at least one processor to cause the apparatus to perform operations comprising:

obtaining a video signal, wherein the video signal comprises a vertical synchronization signal, a horizontal synchronization signal, a pixel clock signal, a display enable signal, and a video data signal;

obtaining active video data in the video data signal based on the pixel clock signal and the display enable signal;

encapsulating a vertical blanking packet based on the vertical synchronization signal;

encapsulating a horizontal blanking packet based on the horizontal synchronization signal;

encapsulating an active video packet based on the active video data;

multiplexing the vertical blanking packet, the horizontal blanking packet, and the active video packet into a video stream for sending;

obtaining, based on the pixel clock signal and the display enable signal, descriptive information in a blanking interval in the video data signal; and encapsulating a descriptive information packet based on the descriptive information; and wherein multiplexing the vertical blanking packet, the horizontal blanking packet, and the active video packet into the video stream for sending comprises:

multiplexing the vertical blanking packet, the horizontal blanking packet, the active video packet, and the descriptive information packet into the video stream for sending.

7. The apparatus according to claim 6, wherein the operations further comprise:

when the video signal further comprises a channel-associated audio signal, encapsulating an audio sampling packet based on the audio signal; and wherein multiplexing the vertical blanking packet, the horizontal blanking packet, the active video packet, and the descriptive information packet into the video stream for sending comprises:

multiplexing the vertical blanking packet, the horizontal blanking packet, the active video packet, the descriptive information packet, and the audio sampling packet into the video stream for sending.

8. The apparatus according to claim 7, wherein the operations further comprise:

encrypting the active video packet and the audio sampling packet based on an encryption parameter and an encryption key to obtain an encrypted active video packet and an encrypted audio sampling packet; and encapsulating an encryption description packet based on the encryption parameter, and encapsulating a key distribution packet based on the encryption key; and wherein multiplexing the vertical blanking packet, the horizontal blanking packet, the active video packet, the descriptive information packet, and the audio sampling packet into the video stream for sending comprises:

multiplexing the vertical blanking packet, the horizontal blanking packet, the encrypted active video packet, the descriptive information packet, the encrypted audio sampling packet, the encryption description packet, and the key distribution packet into the video stream for sending.

9. The apparatus according to claim 6, wherein encapsulating the vertical blanking packet based on the vertical synchronization signal comprises:

encapsulating the vertical blanking packet based on the vertical synchronization signal and video frame control information, wherein the video frame control information comprises a pixel clock parameter of the pixel clock signal.

10. The apparatus according to claim 6, wherein multiplexing the vertical blanking packet, the horizontal blanking packet, and the active video packet into the video stream comprises:

multiplexing the vertical blanking packet, the horizontal blanking packet, and the active video packet into the video stream using a stream multiplexer.

11. An apparatus, which is a slave clock apparatus or included in the slave clock apparatus, wherein the apparatus comprises:

at least one processor; and at least one memory coupled to the at least one processor and storing programming instructions for execution by the at least one processor to cause the apparatus to perform operations comprising:

receiving a video stream, wherein the video stream comprises a vertical blanking packet, a horizontal blanking packet, and an active video packet;

generating a vertical synchronization signal based on the vertical blanking packet;

generating a horizontal synchronization signal based on the horizontal blanking packet;

generating a video data signal and a display enable signal based on the vertical synchronization signal, the horizontal synchronization signal, a pixel clock signal, and active video data carried in the active video packet; and outputting a video signal, wherein the video signal comprises the vertical synchronization signal, the horizontal synchronization signal, the pixel clock signal, the display enable signal, and the video data signal; and wherein the video stream further comprises a descriptive information packet, and wherein generating the video data signal and the display enable signal based on the vertical synchronization signal, the horizontal synchronization signal, the pixel clock signal, and the active video data carried in the active video packet comprises:

generating the video data signal and the display enable signal based on the vertical synchronization signal, the horizontal synchronization signal, the pixel clock signal, the active video data carried in the active video packet, and descriptive information carried in the descriptive information packet.

12. The apparatus according to claim 11, wherein the video stream further comprises an audio sampling packet, and the operations further comprise:

generating an audio signal based on the audio sampling packet, wherein the output video signal further comprises the audio signal.

13. The apparatus according to claim 12, wherein the video stream further comprises an encryption description packet and a key distribution packet, the active video packet and the audio sampling packet are an encrypted active video packet and an encrypted audio sampling packet, and the operations further comprise:

obtaining an encryption parameter carried in the encryption description packet;

obtaining an encryption key carried in the key distribution packet; and decrypting the encrypted active video packet and the encrypted audio sampling packet based on the encryption parameter and the encryption key to obtain a decrypted active video packet and a decrypted audio sampling packet.

14. The apparatus according to claim 11, wherein the video stream further comprises an encryption description packet and a key distribution packet, the active video packet is an encrypted active video packet, and the operations further comprise:

obtaining an encryption parameter carried in the encryption description packet;

obtaining an encryption key carried in the key distribution packet; and decrypting the encrypted active video packet based on the encryption parameter and the encryption key to obtain a decrypted active video packet.

15. The apparatus according to claim 14, wherein the video stream comprises a plurality of vertical blanking packets, encryption description packets, and key distribution packets that are consecutively and repeatedly sent, and the operations further comprise:

selecting, from the plurality of vertical blanking packets, encryption description packets, and key distribution packets that are consecutively and repeatedly sent, a vertical blanking packet, an encryption description packet, and a key distribution packet that pass correctness check.

16. The apparatus according to claim 14, wherein packet headers of the vertical blanking packet, the encryption description packet, and the key distribution packet each comprise a retry flag, and when the retry flag is 1, the retry flag indicates a receive end to check whether the packet is correct and to initiate a retransmission request when the packet is incorrect; and wherein the operations further comprise:

initiating retransmission of the packet when any one of the vertical blanking packet, the encryption description packet, and the key distribution packet is incorrect.

17. The apparatus according to claim 11, wherein after receiving the video stream, the operations further comprise:

demultiplexing the video stream using a stream demultiplexer, to obtain the vertical blanking packet, the horizontal blanking packet, and the active video packet.

* * * * *